US 8,503,376 B2

(12) United States Patent
Cha et al.

(10) Patent No.: US 8,503,376 B2
(45) Date of Patent: Aug. 6, 2013

(54) TECHNIQUES FOR SECURE CHANNELIZATION BETWEEN UICC AND A TERMINAL

(75) Inventors: Inhyok Cha, Yardley, PA (US); Chinmayee V. Rathi, Cupertino, CA (US); Yogendra C. Shah, Exton, PA (US); Louis J. Guccione, East Chester, NY (US); Andreas U. Schmidt, Frankfurt am Main (DE); Nicolai Kuntze, Darmstadt (DE)

(73) Assignee: InterDigital Technology Corporation, Wilmington, DE (US)

( * ) Notice: Subject to any disclaimer, the term of this patent is extended or adjusted under 35 U.S.C. 154(b) by 881 days.

(21) Appl. No.: 12/246,064

(22) Filed: Oct. 6, 2008

(65) Prior Publication Data
US 2009/0209232 A1 Aug. 20, 2009

Related U.S. Application Data

(60) Provisional application No. 60/977,938, filed on Oct. 5, 2007, provisional application No. 60/990,537, filed on Nov. 27, 2007, provisional application No. 61/020,181, filed on Jan. 10, 2008.

(51) Int. Cl.
*H04W 4/00* (2009.01)
*H04W 74/00* (2009.01)
(52) U.S. Cl.
USPC .......................................... 370/329; 455/411
(58) Field of Classification Search
USPC .......................................... 370/329; 455/411
See application file for complete search history.

(56) References Cited

U.S. PATENT DOCUMENTS

| 7,953,391 B2 | 5/2011 | Lee et al. |
| 2006/0085848 A1 | 4/2006 | Aissi et al. |
| 2006/0281442 A1 | 12/2006 | Lee et al. |
| 2007/0042754 A1 | 2/2007 | Bajikar et al. |

(Continued)

FOREIGN PATENT DOCUMENTS

| CN | 1700640 | 11/2005 |
| CN | 101005359 | 7/2007 |

(Continued)

OTHER PUBLICATIONS

3GPP TS 33.110 V7.2.0 (Jun. 2007), 3rd Generation Partnership Project, Technical Speicification Group Services and System Aspects; Key establishment between a Universal Integrated Circuit Card (UICC) and a terminal (Release 7).*

(Continued)

*Primary Examiner* — Derrick Ferris
*Assistant Examiner* — Majid Esmaeilian
(74) *Attorney, Agent, or Firm* — Woodcock Washburn LLP

(57) ABSTRACT

The present invention is related to a wireless communication system. 3G UMTS mobile phone systems rely on a protected smart card called the UMTS integrated circuit card (UICC) that provides UMTS subscriber identity module (USIM) applications as a basis or root of various security measures protecting the communication path between the 3G mobile terminal and the UMTS wireless network (or UTRAN). Disclosed is a method by which the UICC exchanges information with a terminal, such as an Internal Key Center (IKC 1250) and a Bootstrapping Server Function (BSF 1270) enables a procedure where multiple local keys specific to applications and Network Application Functions (NAFs) (Ks_local) are used for authentication and to encrypt and decrypt messages.

17 Claims, 15 Drawing Sheets

U.S. PATENT DOCUMENTS

| | | |
|---|---|---|
| 2007/0101122 A1 | 5/2007 | Guo |
| 2007/0157022 A1 | 7/2007 | Blom et al. |
| 2009/0313472 A1 | 12/2009 | Guccione et al. |

FOREIGN PATENT DOCUMENTS

| | | |
|---|---|---|
| CN | 101102190 | 1/2008 |
| JP | 2002-344438 | 11/2002 |
| JP | 2004-362554 | 12/2004 |
| JP | 2005-244534 | 9/2005 |
| JP | 2005-275944 | 10/2005 |
| JP | 2007-135113 | 5/2007 |
| JP | 2008-066834 | 3/2008 |
| WO | WO 2006/084183 | 8/2006 |
| WO | WO 2006/094838 | 9/2006 |

OTHER PUBLICATIONS

3GPP TS 33.222 V7.2.0 (Sep. 2006), 3rd Generation Partnership Project; Techinal Specification Group Services and System Aspects; Generic Authentication Architecture (GAA); Access to network application functions using Hypertext Transfer Protocol over Transport Layer Security (HTTPS) (Release 7).*

3GPP TS 33.221 V7.0.0 (Jun. 2007); 3rd Generation Partnership Project; Techinal Specification Group Services and System Aspects; Generic Authentication Architecture (GAA); Support for Subscriber certificates (Release 7).*

Adams et al., "Internet X.509 Public Key Infrastructure Certificate Management Protocols", Network Working Group, Request for Comments: 2510, (Mar. 1999).

Blake-Wilson et al., "Transport Layer Security (TLS) Extensions", Network Working Group, Request for Comments: 3546, Updates 2246, (Jun. 2003).

Blunk et al., "PPP Extensible Authentication Protocol (EAP)", Network Working Group, Request for Comments: 2284, (Mar. 1998).

Eronen et al., "Pre-Shared Key Ciphersuites for Transport Layer Security (TLS)", Network Working Group, Request for Comments: 4279, (Dec. 2005).

European Telecommunications Standards Institute, "Smart Cards; Secure Channel Between a UICC and an End-Point Terminal (Release 7)", ETSI TS 102 484, V7.1.0, (Jul. 2008).

Housley et al., "Internet X. 509 Public Key Infrastructure Certificate and Certificate Revocation List (CRL) Profile", Network Working Group, Request for Comments: 3280, Obsoletes: 2459, (Apr. 2002).

Myers et al., "Certificate management Messages Over CMS", Network Working Group, Request for Comments: 2797, (Apr. 2000).

Myers et al., "Internet X.509 Certificate Request Message Format", Network Working Group, Request for Comments: 2511, (Mar. 1999).

Open Mobile Alliance Ltd., "Crypto Object for the ECMA Script Mobile Profile", Candidate Version 1.0, OMA-WAP-ECMACR-V1_0-20040615-C, (Jun. 15, 2004).

Rigney et al., "Radius Extensions", Network Working Group, Request for Comments: 2869, (Jun. 2000).

RSA Laboratories, "RKCS #10 V1.7: Certification Request Syntax Standard", (May 26, 2000).

Third Generation Partnership Project, "Technical Specification Group Services and System Aspects; Generic Authentication Architecture (GAA); Generic Bootstrapping Architecture (Release 7)", 3GPP TS 33.220, V7.8.0, (Jun. 2007).

Third Generation Partnership Project, "Technical Specification Group Services and System Aspects; Generic Authentication Architecture (GAA); Generic Bootstrapping Architecture (Release 7)", 3GPP TS 33.220, V7.9.0, (Sep. 2007).

Third Generation Partnership Project, "Technical Specification Group Services and System Aspects; Generic Authentication Architecture (GAA); Generic Bootstrapping Architecture (Release 7)", 3GPP TS 33.220, V7.11.0, (Mar. 2008).

Third Generation Partnership Project, "Technical Specification Group Services and System Aspects; Generic Authentication Architecture (GAA); Generic Bootstrapping Architecture (Release 8)", 3GPP TS 33.220, V8.1.0, (Sep. 2007).

Third Generation Partnership Project, "Technical Specification Group Services and System Aspects; Generic Authentication Architecture (GAA); Generic Bootstrapping Architecture (Release 8)", 3GPP TS 33.220, V8.4.0, (Sep. 2008).

Third Generation Partnership Project, "Technical Specification Group Services and System Aspects; Key Establishment Between a UICC Hosting Device and Remote Device (Release 7)", 3GPP TS 33.259, V7.0.0, (Jun. 2007).

Third Generation Partnership Project, "Technical Specification Group Services and System Aspects; Key Establishment Between a UICC Hosting Device and Remote Device (Release 7)", 3GPP TS 33.259, V7.1.0, (Sep. 2007).

Third Generation Partnership Project, "Technical Specification Group Services and System Aspects; Key Establishment Between a UICC Hosting Device and Remote Device (Release 7)", 3GPP TS 33.259, V7.2.0, (Dec. 2007).

Third Generation Partnership Project, "Technical Specification Group Services and System Aspects; Key Establishment Between a UICC Hosting Device and Remote Device (Release 8)", 3GPP TS 33.259, V8.1.0, (Mar. 2008).

Third Generation Partnership Project, "Technical Specification Group Services and System Aspects Key Establishment Between a Universal Integrated Circuit Card (UICC) and a Terminal; (Release 7)", 3GPP TS 33.110, V7.0.0, (Dec. 2006).

Third Generation Partnership Project, "Technical Specification Group Services and System Aspects Key Establishment Between a Universal Integrated Circuit Card (UICC) and a Terminal; (Release 7)", 3GPP TS 33.110, V7.2.0, (Jun. 2007).

Third Generation Partnership Project, "Technical Specification Group Services and System Aspects Key Establishment Between a Universal Integrated Circuit Card (UICC) and a Terminal; (Release 7)", 3GPP TS 33.110, V7.3.0, (Sep. 2007).

Third Generation Partnership Project, "Technical Specification Group Services and System Aspects Key Establishment Between a Universal Integrated Circuit Card (UICC) and a Terminal; (Release 7)", 3GPP TS 33.110, V7.5.0, (Mar. 2008).

Third Generation Partnership Project, "Technical Specification Group Services and System Aspects; 3G Security; Cryptographic Algorithm Requirements (Release 7)", 3GPP TS 33.105, V7.0.0, (Jun. 2007).

Third Generation Partnership Project, "Technical Specification Group Services and System Aspects; Generic Authentication Architecture (GAA); Support for Subscriber Certificates (Release 7)", 3GPP TS 33.221, V7.0.0, (Jun. 2007).

Third Generation Partnership Project, "Technical Specification Group Services and System Aspects; Generic Authentication Architecture (GAA); Support for Subscriber Certificates (Release 7)", 3GPP TS 33.221, V7.1.0, (Dec. 2007).

Third Generation Partnership Project, "Technical Specification Group Services and System Aspects; Generic Authentication Architecture (GAA); Access to Network Application Functions Using Hypertext Transfer Protocol Over Transport Layer Security (HTTPS) (Release 7)", 3GPP TS 33.222, V7.0.0, (Sep. 2005).

Third Generation Partnership Project, "Technical Specification Group Services and System Aspects; Generic Authentication Architecture (GAA); Access to Network Application Functions Using Hypertext Transfer Protocol Over Transport Layer Security (HTTPS) (Release 7)", 3GPP TS 33.222, V7.2.0, (Sep. 2006).

Third Generation Partnership Project, "Technical Specification Group Services and System Aspects; Generic Authentication Architecture (GAA); Access to Network Application Functions Using Hypertext Transfer Protocol Over Transport Layer Security (HTTPS) (Release 7)", 3GPP TS 33.222, V7.3.0, (Dec. 2007).

Third Generation Partnership Project, "Technical Specification Group Services and System Aspects; Generic Authentication Architecture (GAA); Access to Network Application Functions Using Hypertext Transfer Protocol Over Transport Layer Security (HTTPS) (Release 8)", 3GPP TS 33.222, V8.0.0, (Jun. 2008).

Trusted Computing Group, "Mobile Phone Work Group Use Case Scenarios—V2.7", (2005).

Trusted Computing Group, "TCG Mobile Reference Architecture", Specification Version 1.0, Revision 1, (Jun. 12, 2007).

Trusted Computing Group, "TCG Mobile Trusted Module Specification", Specification Version 1.0, Revision 1, (Jun. 12, 2007).

Trusted Computing Group, "TCG Specification Architecture Overview", Specification Revision 1.2, (Apr. 28, 2004).
Trusted Computing Group, "TPM Main Part 1 Design Principles", Specification Version 1.2, Revision 85, (Feb. 13, 2005).
Wireless Application Protocol Forum, Ltd., "Wireless Application Protocol Public Key Infrastructure Definition", WPKI, WAP-217-WPKI, Version Apr. 24, 2001.
Wireless Application Protocol Forum, Ltd., "Wireless Identity Module", Part: Security, Version Jul. 12, 2001, WAP-260-WIM-20010712-a, (Jul. 12, 2001).
Third Generation Partnership Project, "Technical Specification Group Services and System Aspects; Generic Authentication Architecture (GAA); Generic Bootstrapping Architecture (Release 8)", 3GPP TS 33.220, V8.4.0, (Sep. 2008)
Third Generation Partnership Project, "Technical Specification Group Services and System Aspects; Key Establishment Between a UICC Hosting Device and Remote Device (Release 7)", 3GPP TS 33.259, V7.0.0 (Jun. 2007).
Third Generation Partnership Project, "Technical Specification Group Services and System Aspects; Key Establishment Between a UICC Hosting Device and Remote Device (Release 7)", 3 GPP TS 33.259, V7.2.0, (Dec. 2007).
Wireless Application Protocol Forum, Ltd., "Wireless Identity Module", Part: Security, Version Jul. 12, 2001, WAP-260-WIM-20010712-a.
U.S. Appl. No. 12/419,798: Non Final Rejection, dated Jan. 26, 2012, 12, pages.
$3^{rd}$ Generation Partnership Project (3GPP), TS 33.110, V1.0.0, "$3^{rd}$ Generation Partnership Project; Technical Specification Group Services and Systems Aspects; Key Establishment between a UICC and a Terminal (Release 7)", Jun. 2006, 17 pages.
European Patent Application No. 09729774.1, Communication pursuant to Rules 161(1) and 162 EPC, dated Nov. 17, 2010, 2 pages.
Interdigital, "New Review of Threats to UICC-ME/Terminal Interfaces and Possible Impact on Other Protocols", 3GPP TSG SA WG3 Security S3#50 Meeting, S3-080087, (Sanya, China, Feb. 25-29, 2008), 5 pages.
Third Generation Partnership Project, "Technical Specification Group Services and System Aspects; 3G Security; Specification of the 3GPP Confidentiality and Integrity Algorithms; Document 1: f8 and f9 Specification (Release 6)", 3GPP TS 35.201 V6.1.0 (Sep. 2005).
Third Generation Partnership Project, "Technical Specification Group Services and System Aspects; Key Establishment Between a Universal Integrated Circuit Card (UICC) and a Terminal (Release 8)", 3GPP TS 33.110 V8.0.0, (Dec. 2008), 28 pages.
Third Generation Partnership Project, Technical Specification Group Services and System Aspects; 3G Security; Specification of the 3GPP Confidentiality and Integrity Algorithms; Document 1:f8 and f9 Specification (Release 1999), 3GPP TS 35.201 V3.2.0, (Dec. 2001).
Third Generation Partnership Project, "Technical Specification Group Services and System Aspects; 3G Security; Specification of the 3GPP Confidentiality and Integrity Algorithms; Document 1: f8 and f9 Specification (Release 8)", 3GPP TS 35.201 V8.0.0 (Dec. 2008).
Third Generation Partnership Project, "Technical Specification Group Services and System Aspects; 3G Secuirty; Specification of the 3GPP Confidentiality and Integrity Algorithms; Document 1: f8 and f9 Specification (Release 7)", 3GPP TS 35.201 V7.0.0 (Jun. 2007), 22 pages.
Third Generation Partnership Project, "Technical Specification Group Services and System Aspects; 3G Security; Security Architecture (Release 4)", 3GPP TS 33.102 V4.5.0 (Dec. 2002), 61 pages.
Third Generation Partnership Project, "Technical Specification Group Services and System Aspects; 3G Security; Security Architecture (Release 1999)", 3GPP TS 33.102 V3.13.0 (Dec. 2002), 63 pages.
Third Generation Partnership Project, "Technical Specification Group Services and System Aspects; 3G Security; Security Architecture (Release 5)", 3GPP TS 33.102 V5.7.0 (Dec. 2005), 61 pages.
Third Generation Partnership Project, "Technical Specification Group Services and System Aspects; 3G Security; Security Architecture (Release 6)", 3GPP TS 33.102 V6.5.0 (Dec. 2005), 63 pages.
Third Generation Partnership Project, "Technical Specification Group Services and System Aspects; 3G Security; Security Architecture (Release 7)", 3GPP TS 33.102 V7.1.0 (Dec. 2006), 64 pages.
Third Generation Partnership Project, "Technical Specification Group Services and System Aspects; 3G Security; Security Architecture (Release 8)", 3GPP TS 33.102 V8.2.0 (Mar. 2009).
Third Generation Partnership Project, "Technical Specification Group Services and System Aspects; Recommendations for Trusted Open Platforms (Release 7)", 3GPP TS 33.905 V7.0.0 (Mar. 2007).
Third Generation Partnership Project, "Technical Specification Group Services and System Aspects; Key Establishment Between a Universal Integrated Circuit Card (UICC) and a Terminal (Release 7)" 3GPP TS 33.110 V7.5.0 (Mar. 2008).
Third Generation Partnership Project, "Technical Specification Group Services and System Aspects; Specification of the 3GPP Confidentiality and Integrity Algorithms; Document 1: f8 and f9 Specification (Release 5)", 3GPP TS 35.201 V5.0.0 (Jun. 2002).
Third Generation Partnership Project, "Technical Specification Group Services and System Aspects; Recommendations for Trusted Open Platforms (Release 8)", 3GPP TS 33.905 V8.0.0 (Dec. 2008), 15 pages.
Third Generation Partnership Project, ETSI TS 133.110, "Universal Mobile Telecommunications System (UMTS); Key Establishment between a UICC and a Terminal", (Release 7), 3GPP TS 33.110 V7.3.0, Oct. 2007, 13 pages.
Third Generation Partnership Project, ETSI TS 133.220, "Digital Cellular Telecommunications System (Phase 2+); Universal Mobile Telecommunications System (UMTS); Generic Authentication Architecture (GAA); Generic Bootstrapping Architecture", (Release 7), 3GPP TS 33.220 V7.9.0, Oct. 2007, 31 pages.
Third Generation Partnership Project, ETSI TS 133.259, "Digital Cellular Telecommunications System (Phase 2+); Universal Mobile Telecommunications System (UMTS); Key Establishment Between a UICC Hosting Device and a Remote Device", (Release 7), 3GPP TS 33.259 V7.1.0, Oct. 2007, 13 pages.
3rd Generation Partnership Project (3GPP), "3rd Generation Partnership Project; Technical Specification Group Services and System Aspects; 3G Security; Specification of the 3GPP Confidentiality and Integrity Algorithms; Document 1: F8 and F9 Specification", 3GPP TS 35.201 V4.1.0 (Release 4), Dec. 2001, 22 pages.
3rd Generation Partnership Project (3GPP), "3rd Generation Partnership Project; Technical Specification Group Services and System Aspects; 3G Security; Security Architecture", 3GPP TS 33.102 V8.0.0 (Release 8), Jun. 2008, 65 pages.
3rd Generation Partnership Project (3GPP), ETSI 133 221, V7.0.0, "Digital Cellular Telecommunications System (Phase 2+); Universal Mobile Telecommunications System (UMTS); Generic Authentication Architecture (GAA); Support for Subscriber Certificates", 3GPP TS 33.221 version 7.0.0 (Release 7), Jun. 2007, 27 pages.
3rd Generation Partnership Project (3GPP), ETSI 133 222, V7.2.0, "Digital Cellular Telecommunications System (Phase 2+); Universal Mobile Telecommunications System (UMTS); Generic Authentication Architecture (GAA); Access to Network Application Functions using Hypertext Transfer Protocol Layer Security (HTTPS)", 3GPP TS 33.222 version 7.2.0 (Release 7), Sep. 2006, 5 pages.
U.S. Appl. No. 12/419,798: Final Rejection, dated Aug. 22, 2012, 14 pages.
English Translation of Japanese Patent Application No. 2011-504132, Official Notice of Rejection dated Jan. 8, 2013, 4 pages.
Ikeno et al., "Modern Cryptographic Theory", First Ed., The Institute of Electronics, Information and Communication Engineers, (IEIEC), Sep. 1986, 175-178.

* cited by examiner

TECHNIQUES FOR SECURE CHANNELIZATION BETWEEN UICC AND A TERMINAL

CROSS REFERENCE TO RELATED APPLICATIONS

This application claims the benefit of U.S. Provisional Application No. 60/977,938, filed Oct. 5, 2007, U.S. Provisional Application No. 60/990,537, filed Nov. 27, 2007 and U.S. Provisional Application No. 61/020,181, filed Jan. 10, 2008, which are incorporated by reference as if fully set forth.

FIELD OF INVENTION

This application is related to wireless communications.

BACKGROUND OF THE INVENTION

In Release 7 of the UMTS cellular wireless communication system, the standardization setting body 3rd Generation Partnership Project (3GPP) has drafted technical specification TS 33.220-780 to strengthen the existing authentication and key agreement (AKA) process. The newer AKA process described in the TS 33.220 specifies a process involving the wireless transmit/receive unit (WTRU) that incorporates a UMTS Integrated Circuit Card (UICC) and the Home Location Register/Home Subscriber System (HLR/HSS).

FIG. 1 shows the network elements and their respective interfaces envisioned for the AKA process. A bootstrapping server function (BSF) is part of the network element which is under the control of a mobile network operator (MNO) and participates in the generic bootstrapping architecture (GBA) with UICC-based enhancements (GBA_U) along with the WTRU and the HSS to establish a shared secret between the network and the WTRU. A network application function (NAF) is hosted as part of the network element and uses a GBA established shared secret for deriving keys for securing the communication path between the WTRU and a NAF. A subscriber location function (SLF) is used by the bootstrapping server function (BSF) to acquire the details of the Home Subscriber System (HSS), which contains the required subscriber specific data when the BSF is not configured or managed by a pre-defined HSS. The HSS stores all the user security settings (USS), the subscriber has either a multiple IP multimedia services identity module (ISIM) or user services identity module (USIM) applications on the UICC. The HSS may contain one or more GBA user security settings (GUSS) which can be mapped to one or more private identities. Ub refers to the reference point between the WTRU and the BSF. The mutual authentication procedure between the WTRU and the BSF takes place on this reference point and session keys are bootstrapped based on 3GPP AKA infrastructure. Ua is the reference point between the WTRU and the NAF that carries the application protocol and is secured by deriving keys based on the key material agreed between the WTRU and the BSF as a result of HTTP Digest AKA over the Ub reference point. Zn is the reference point between the NAF and the BSF and is used by the NAF to acquire the key material (agreed during previous HTTP Digest AKA protocol over Ub) and the application specific USS from the BSF. Zh is the reference point between the BSF and the HSS and is used by the BSF to retrieve the authentication information and GUSS from the HSS. Dz is the reference point between the BSF and the SLF and is used by the BSF to retrieve the name of the HSS which contains the subscriber specific information.

Two procedures are discussed in TS 33.220. The first is the GBA enhanced by the UICC (GBA_U) process, and the second is the Security Association (SA) process.

In the GBA_U process, the UICC and the BSF mutually authenticate each other and establish key Ks called the GBA_U key by deriving it from a subscriber authentication key K that is shared between the UICC and the HLR/HSS.

Referring to FIG. 2, steps for the GBA_U process are as shown and are further described as follows. An ME, at step S1, sends an HTTP request to the BSF for the initiation of a GBA_U process. The ME inserts a user identity (temporary IP multimedia private identity (TMPI) or IP Multimedia Private Identity (IMPI)) in the username parameter field of the HTTP request. The BSF, at S2, fetches the Authentication Vector (AV=RAND∥AUTN∥XRES∥CK∥IK) and the GBA user security settings (GUSS) from HLR/HSS (over the Zh reference point), where AUTN=$SQN_{MS} \oplus [AK] \| AMF \| MAC$. The BSF then computes MAC* (=MAC$\oplus$Trunc(SHA-1 (IK))). The MAC is used to protect the integrity of the RAND and the AUTN. The BSF, at S3, forwards the RAND and AUTN* (=SQN xor AK∥AMF∥MAC*) to the ME and stores XRES, CK and IK, in an HTTP 401 Unauthorized WWW—Authenticate: Digest message. The ME, at S4, forwards the received RAND and AUTN* to the UICC, in a HTTP 401 Unauthorized WWW—Authenticate: Digest message. The UICC, at S5, runs the AKA algorithm, i.e., computes IK and XMAC and then the UICC checks AUTN (i.e. SQN$\oplus$AK∥AMF∥MAC) to verify that the challenge is from an authorized network; the UICC also calculates CK and RES. This will result in the creation of the session keys CK and IK, where Ks=CK∥IK, in both the BSF and UICC. The UICC, at S6, forwards RES to ME. The ME, at S7, sends another HTTP request to the BSF, which contains the Digest AKA response, calculated using RES. The BSF, at S8, verifies the authenticity of the UE, by comparing the received RES with XRES and at S9, creates Ks=CK∥IK and a Bootstrapping Transaction Identifier (B-TID). The BSF, at S10, sends back a 200 OK message including the B-TID and the Key Lifetime to indicate the success of the authentication. The ME, at S11, sends the B-TID and Key Lifetime to the UICC. The UICC, at S12, stores Ks=CK∥IK, B-TID, and the Key Lifetime.

At the end of the GBA_U process, depicted in FIG. 2, both the UICC and the BSF are in state where they can, if needed in a later stage such as the Security Association stage, respectively use the Ks they both have to derive Network Access Function (NAF)-specific keys Ks_ext_NAF and Ks_int_NAF. These derived keys Ks_ext_NAF and Ks_int_NAF are later used to secure the Ua reference point. Ks_ext_NAF is computed in the UICC as Ks_ext_NAF=KDF(Ks, "gba-me", RAND, IMPI, NAF_Id); Ks_int_NAF is computed in the UICC as Ks_int_NAF=KDF(Ks, "gba-u, RAND, IMPI, NAF_Id); NAF_Id=FQDN of the NAF∥Ua security protocol identifier. KDF is the key derivation function as specified in TS 33.220-780 Annex B.

After the Ks is established in the GBA_U process, the Security Association process takes place between the NAF and the WTRU. The purpose of this process is for the WTRU and the NAF to decide whether to use the GBA keys (Ks_int_NAF and/or Ks_ext_NAF). By default Ks_ext_NAF is used to later derive the key stream to be used to encrypt the packets between the WTRU and the NAF. However, if Ks_int_NAF or both Ks int_NAF AND Ks_ext_NAF are to be used, then this must be agreed upon in the security association process. Note that such an agreement will overrule the default selection. Also, the key selection indication may be specified in the application specific USS.

Referring to FIG. 3, which depicts the security association steps, the WTRU (ME), before starting communication, checks that Ks (created by GBA_U) is present and is current, and if not, then GBA_U is initiated to create Ks. If Ks is valid and current, ME, at S1, retrieves the B-TID from the UICC and the UICC derives Ks_int/ext_NAF keys. The ME, at S2, sends the B-TID to the NAF as a part of an application request. The NAF, at S3, sends an Authentication Request (incl. B-TID and NAF-ID) to the BSF to send keys corresponding to the B-TID over the Zn reference point. The BSF, at S4, derives Ks_int_NAF and Ks_ext_NAF. If the NAF is GBA_U aware, at S4, it delivers both keys, otherwise it only supplies Ks_ext_NAF along with some other information such as bootstrapping time, lifetime of keys, etc. The NAF will then look into the USS if it is returned from the BSF, to check if the key selection indication is present in which case key(s) indicated in the USS will be used and will then store these key(s). The NAF, at S7, sends the WTRU an Application Answer, indicating that the NAF now has the keys Ks_ext/int_NAF.

Recently, 3GPP TS 33.110-700 proposed the establishment of platform and application specific key Ks_local between the UICC and the Terminal. This key is intended to be used by the UICC and the terminal to secure the channel between them.

The architecture of the reference points in the case where the Terminal is a part of the UICC holding device is shown in FIG. 4. The network elements of FIG. 4 are the same as shown in FIG. 1 with the exception of providing the UICC hosting device. The protocol flow establishing Ks_local between the UICC and the Terminal is shown in FIG. 5. The Terminal, at S1, checks whether a valid Ks key exists in the UICC, by fetching the B-TID and corresponding lifetime from the UICC. If no valid key ks is available in the UICC, the Terminal will request the GBA bootstrapping procedure to establish the Ks key between BSF and UICC. The Terminal then checks whether a valid Ks_int_NAF exists, and if so, it requests the UICC to retrieve B-TID value for the NAF_ID corresponding to the NAF Key Center. If the Terminal does not have the NAF_ID, it requests the UICC to retrieve the value at S2. The UICC, at S3, returns the NAF_ID and B-TID corresponding to the NAF Key Center. The Terminal and NAF Key Center establish the HTTPS type tunnel at S4, with certificate based mutual authentication between the Terminal and the NAF Key Center. The Terminal, at S5, sends a "service request" message over the tunnel, whose payload contains B-TID, the Terminal identifier (Terminal_ID), the smart card identifier (ICCID), the application identifier of UICC application (UICC_appli_ID) and the application identifier of the terminal application (Terminal_appli_ID) requiring the establishment of key Ks_local, and a variable value RANDx. When a platform-specific key, rather than an application-specific key, is desired, the parameters UICC_appli_ID and Terminal_appli_ID will equal the static ASCII-encoded string "platform". The NAF key center, at S6, determines if the Terminal ID/ICCID is not blacklisted or if the key establishment procedure is allowed for the targeted applications. If these conditions are not met, the NAF key center responds with an appropriate error code and terminates the TLS connection with the Terminal. The NAF key center, at S6, then contacts the BSF and sends B-TID and its own NAF_ID in a credential request (the purpose of this request is to ask the BSF to return related keys Ks_int_NAF and Ks_ext_NAF. Note that Ks_local will be generated only from Ks_int_NAF). The BSF derives Ks_int_NAF and Ks_ext_NAF, and at S7, returns these keys and related information such as bootstrapping time, key lifetime, etc, to the NAF Key Center. The NAF key center, at S8, then generates a suitable 16 octet counter limit for use in the UICC and associates a key lifetime to the derived key Ks_local for use in the terminal. It then derives Ks_local from Ks_int_NAF, using the key derivation function (KDF) as follows:

$$Ks\_local = KDF(Ks\_int\_NAF, B\text{-}TID, Terminal\_ID, ICCID, Terminal\_appli\_ID, UICC\_appli\_ID, RANDx, counter\ limit)$$

The NAF key center, at S9, then delivers Ks_local, along with the B-TID, key lifetime and the counter limit, to the Terminal, over the HTTPS tunnel established in step S4. At S10, the Terminal stores in its own storage Ks_local and the associated parameters such as the key lifetime, ICCID, Terminal_appli_ID, and UICC_appli_ID. At S11, the Terminal requests the UICC to generate Ks_local and sends it the key material (NAF_ID, Terminal ID, Terminal_appli_ID, UICC_appli_ID, RANDx and counter limit value), along with MAC (=HMAC-SHA-256[Ks_local, NAF_ID∥Terminal_ID∥ICCID∥Term_appli_ID∥UICC_appli_ID∥RANDX∥ Counter Limit]) which in turn is truncated to 16 octets=128 bits. The UICC, at S12, retrieves the Ks_int_NAF and B-TID and generates Ks_local=KDF (Ks_int_NAF, B-TID, Terminal_ID, ICCID, Terminal_appli_ID, UICC_appli_ID, RANDx, Counter Limit). The UICC computes MAC'= (HMAC-SHA-256[Ks_local, NAF_ID∥Terminal_ID∥ICCID∥Terminal_appli_ID∥UICC_appli_ID∥RANDX∥Counter Limit]) which in turn is truncated to 16 octets=128 bits. The computed MAC' is compared with the received MAC. If MAC' and MAC don't match, a failure message is sent back to the Terminal, at S13. If there is a match between MAC and MAC', Ks_local and associated parameters such as Terminal_ID, Terminal_appli_ID, UICC_appli_ID and the counter limit are stored in the UICC. At S13, the UICC returns a "verification successful message", created using Ks_local and the MAC algorithm HMAC-SHA-256 truncated to 16 octets, to the Terminal.

FIG. 5 depicts the establishment of a key between a UICC and a Terminal. The local key establishment process from TS33.110 v7.2.0 relies on the establishment of an HTTPS tunnel (see step S4 in FIG. 5). In TS33.110 v7.2.0, it is specified that the HTTPS tunnel be established using subscriber certificates that certify a public key be used in setting up the tunnel later. The recent 3GPP specification TS33.221 v7.0.0 specifies the steps where such a subscriber certificate is to be established using the steps depicted in FIG. 6.

The sequence diagram in FIG. 6 describes the certificate request when using Public Key Cryptography Standard (PKCS) #10 with HTTP Digest authentication. At S1, the WTRU sends an empty HTTP request to the Public Key Infrastructure (PKI) portal. The PKI portal, at S2, sends an authentication challenge response using HTTP response code 401 "Unauthorized" which contains a WWW-Authenticate header. The header instructs the WTRU to use HTTP Digest authentication. The WTRU generates the HTTP request by calculating the Authorization header values using the bootstrapping transaction identifier (B-TID) it received from the BSF as username and the NAF specific session key Ks_NAF. If the certificate request needs extra assurance by a wireless identity module (WIM) application for key proof-of-origin, the WTRU generates a WIM challenge request containing parameters needed for key proof-of-origin generation. The WTRU, at S4, sends an HTTP request to the PKI portal and includes the WIM challenge request in this request. At S5, the PKI portal, acting as an NAF, receives the request, verifies the authorization header, by fetching the NAF specific session key Ks_NAF from the BSF using the B-TID, calculating the corresponding digest values using Ks_NAF, and comparing the calculated values with the received values in the authorization header. If the verification is successful and extra assurance for the WIM application is needed, the PKI portal may use the PKI portal specific user security setting to compute the WIM challenge response. The PKI portal, at S6, sends back a WIM challenge response containing additional parameters needed for the subsequent PKCS#10 request generation. The PKI portal may use session key Ks_NAF to integrity protect and authenticate this response. The WTRU, at S7, generates the PKCS#10 request and at S8, sends it to the PKI portal using an HTTP Digest request. In the case where the private key is stored in a WIM application, the ME requests the AssuranceInfo from the WIM application and include it in the PKCS#10 request, if provided. The enrollment request will follow the PKCS#10 certificate enrollment format. Adding AssuranceInfo in this request is defined in the OMA ECMA Script specification. The AssuranceInfo provides a proof of origin for the key processing. (E.g. identifies the WIM application and provides proof that the key is stored in it). The WTRU may indicate the desired format of the certification response: a certificate, a pointer to the certificate (e.g., URL), or a full certificate chain (i.e., from the issued certificate to the corresponding root certificate). The WTRU sends an HTTP request for certificate enrollment to the PKI Portal. The enrollment request shall be as follows:

```
POST <base URL>?response=<indication>[other URL parameters]
HTTP/1.1
Content-Type: application/x-pkcs10
    <base64 encoded PKCS#10 blob>
``` where: <base URL> identifies a server/program. The label <indication> is used to indicate to the PKI portal the desired response type for the WTRU. The possible values are: "single" for subscriber certificate only, "pointer" for pointer to the subscriber certificate, or "chain" for full certificate chain. Further, other URL parameters are additional, optional, URL parameters. The PKCS#10 request is processed by the PKI portal, at S9. If the PKI portal is a Certification Authority (CA), then the certificate is generated at the PKI portal. If the PKI portal is only a registration authority (RA) but not a CA, the PKCS#10 request is forwarded to the CA using any protocol available such as the CMC as specified in IETF RFC 2797 or CMP as specified in IETF RFC 2510 and IETF RFC 2511. In this case, after the PKCS#10 request has been processed and a certificate has been created, the new certificate is returned to the PKI portal. In either case, the PKI portal, at S10, generates an HTTP response containing the certificate, or the pointer to the certificate as defined in clause 7.4 of OMA Wireless PKI spec (WPKI), or a full certificate chain from the issued certificate to the root certificate. If the HTTP response contains the subscriber certificate itself, it shall be base64 encoded, and it may be demarcated as follows:

```
HTTP/1.1 200 OK
Content-Type: application/x-x509-user-cert
-----BEGIN CERTIFICATE-----
<base64   encoded   X.509   certificate   blob>
-----END CERTIFICATE-----
```

If the HTTP response contains the pointer to the certificate, the CertResponse structure defined in subclause 7.3.5 of the OMA WPKI shall be used, and it may be demarcated as follows:

```
HTTP/1.1 200 OK
Content-Type: application/vnd.wap.cert-response
-----BEGIN CERTIFICATE RESPONSE-----
<base64 encoded CertResponse structure blob>
-----END CERTIFICATE RESPONSE-----
```

If the HTTP response contains a full certificate chain in PkiPath structure as defined in and it shall be base64 encoded:

```
HTTP/1.1 200 OK
Content-Type: application/pkix-pkipath
    <base64 encoded PkiPath blob>
```

The content-type header value for the certificate chain is "application/pkix-pkipath". The PKI portal may use session key Ks_NAF to integrity protect and authenticate the response, if a certificate or a pointer to the certificate is sent to the WTRU. The PKI portal shall use integrity protection and authenticate the response if full certificate chain is sent to the WTRU. When the WTRU receives the subscriber certificate or the URL to subscriber certificate, it is stored to local certificate management system, at S11.

Problems of the Prior Art

Both the GBA_U process and the security association process have privacy issues because in both processes the UICC and the Terminal exchange between them, as well as between the Terminal and the network (BSF, NAF), many parameters over open channels, before a secure local channel between the UICC and the Terminal, or a secure channel between the terminal and the BSF (or NAF) is formed. For example, the transfer of parameters such as AUTN and RAND from the BSF to the UICC is in plain text on an open channel. Integrity protection between the UICC and the BSF is offered for the authentication information (AUTN) and the random number (RAND) which acts the nonce (i.e., as a number or bit stream used only once in security engineering by) the use of Message Authentication Code (MAC) (and expected MAC) (XMAC) and user response (RES) and expected RES (XRES), respectively. However, since the channel is open, there is risk of snooping, causing privacy concerns, as well as the risk of exposing the K eventually due to cryptanalysis.

The prior art also includes problems due to open-channel transfer of session keys. The session keys, derived inside the UICC (using the Ks or Ks_NAF in the derivation), are transferred out of the UICC to the Terminal, to be later used by the Terminal for session encryption or decryption, and are performed over an unsecured channel. Consequently, eavesdropping agents may intercept the session keys, and encrypt or decrypt messages exchanged between the Terminal and the network. In this event, many of the subsequent procedures, such as the subscriber certificate establishment, which is needed to establish the HTTPS tunnel between the terminal and the NAF Key Center for the latter to derive and then transport (from the NAF Key Center) the local key (Ks_local), will be at risk of breach. Because the local key itself is transported over the HTTPS tunnel, the breach of the session key then leads to breach of the local key. Subsequently, when and if the local key persists after resets or phone boots, and used in the encrypted transfer of information between the UICC and the terminal, all such communication will be at risk.

Problems in the Local Key Establishment

The procedures to establish Ks_local found in TS 33.110-720 have the following problems:

1) Inefficiency due to multiple OTA connections—The Terminal has to go through the over-the-air GBA_U process to establish the Ks key. In an attempt to establish Ks_local, derived from Ks which itself is based on the Subscriber Secret (K) shared between the UICC and the HSS, TS 33.110 proposes that the key establishment procedure for the Ks_local between the UICC and the Terminal to follow an over-the-air protocol again, and, per each NAF that specifies the application to be used for that channel. Since the standard allows multiple different local keys, each specific for a different NAF, to be generated this way, if one wants to establish multiple such keys, one has to go through many OTA procedures.

2) Information Privacy Issues—Values of many parameters such as NAF_ID, terminal ID, Terminal_appli_ID, UICC_appli_ID, RANDx and Counter Limit value, are transferred over an open channel between the UICC and the Terminal. Some of these parameters, if exposed, could pose privacy risks.

3) In the HTTPS tunnel between NAF key center and the Terminal—In 3GPP TS 33.110 V7.2.0 (see FIG. 5, steps S4 and S5), the tunnel is supposed to be created using certificate based mutual authentication and to be used in the transfer of the Ks_local and key material from the NAF key center to the Terminal. The subscriber certificate can be either issued to the Terminal or an application running in the UICC. The private and public keys that are needed for establishing the subscriber certificate, in turn, can reside either inside the UICC or on the Terminal. In many of these cases there are security vulnerabilities due to the need to transfer such sensitive information as the private key or the public key, or the subscriber certificates, or the Ks_ext_NAF key, over unsecured channels between the UICC and the Terminal. Some scenarios and vulnerabilities associated with these scenarios are set forth below.

FIGS. 7-9 show three (3) different scenarios of a Subscriber Certificate establishment process.

In scenario A1, shown in FIG. 7, the Private/Public Key pair is on the Terminal. The UICC is responsible for subscriber certificate establishment with PKI (=NAF) via an HTTP session. Assuming the GBA/GBA_U procedure has already taken place, the Ks_NAF/Ks_ext_NAF key is present on the UICC. There are flaws in the current solution in scenario A1. Most notably, at step S5, the Terminal has to send the Public key for certification to the UICC on an open channel. In addition, the UICC, at step S11, sends the subscriber certificate (to be used for HTTPS session) to the Terminal over an open channel.

In scenario A2, shown in FIG. 8, the Private/Public Key pair is on the Terminal. The Terminal is responsible for subscriber certificate establishment with PKI (=NAF) via an HTTP session. Assuming the GBA/GBA_U procedure has already taken place, the Ks_NAF/Ks_ext_NAF key is present on the UICC, as shown at step S1. There are flaws associated with the current solution in Scenario A2. Most notably, the UICC, at S1, sends Ks_ext_NAF (which the Terminal needs to validate the HTTP Digest during subscriber certificate session) to the Terminal over an open channel.

In scenario A3, shown in FIG. 9, the Private/Public Key pair is on the Terminal. The Terminal is responsible for subscriber certificate establishment with PKI (=NAF) via HTTP session via steps S1 through S11. Assuming the GBA/GBA_U procedure has already taken place, the Ks_NAF/Ks_ext_NAF key is present on the UICC. The Terminal at S1, receives Ks_ext_NAF over a secure OTA channel, secured by a session key Kss, with PKI (=NAF). Note that this assumes a change in the standard where the Ks_ext_NAF is sent from the PKI (NAF) to the Terminal. There are, however, flaws associated with the current solution in scenario A3. Currently, any session key is used by the Terminal so that a Ks has to be sent by the UICC to the Terminal, over an open channel, under current phone architectures, as shown at S0. This means an eavesdropper can intercept the session key, and decrypt any message (including subscriber certificate process messages). This flaw (clear transfer of session key) is a general problem that can affect even the first AKA process. Two (2) different scenarios of a local key establishment process are shown in FIGS. 10-11.

In scenario B1, shown in FIG. 10, the Private/Public Key pair is on the Terminal. The Terminal is responsible for HTTPS tunnel establishment, at S4, using the subscriber certificate established in Process A (TS 33.110). There are flaws of the current solution in Scenario B1. Most notably, the terminal, at step S10, sends the public key for certification to UICC on an open channel. Furthermore, the UICC, at S12, sends the subscriber certificate (to be used for HTTPS session) to the Terminal over an open channel.

In scenario B2, shown in FIG. 11, the private/public key pair is on the UICC. The Terminal, as shown at S5, is responsible for HTTPS tunnel establishment, using the subscriber certificate established in Process A (33.110). There are, however, flaws associated with the current solution in scenario B1. Most notably, there is no secure channel between UICC and Terminal. Furthermore, an attacker can intercept the subscriber certificate and private key (since the private key has to be sent over to the Terminal by the UICC over open channel, as shown at S4), which causes the HTTPS tunnel to be compromised. In addition, the Ks_local is revealed to an attacker, see step S13.

SUMMARY

3G UMTS mobile phone systems rely on a protected smart card called the UMTS integrated circuit card (UICC) that provides UMTS subscriber identity module (USIM) applications as a basis or root of various security measures protecting the communication path between the 3G mobile terminal and the UMTS wireless network (or UTRAN).

The UICC exchanges information with the terminal (ME) and the bootstrapping server function (BSF) wherein multiple local keys specific to applications and network application functions (NAFs) (Ks_local), which are themselves derived by multiple instantiations of NAF-specific keys (Ks_int/ext_NAF's) are used to derive keys used to encrypt the local channel between the UICC and the terminal (ME), eliminating multiple over the air (OTA) procedures to derive keys for each of the NAFs. The methods proposed herein enable the local key derivation and security association with multiple NAFs in 'bulk' procedure, mitigating the need for excessive OTA connections.

Another concept proposed herein is the use of an Internal Key Center (IKC). An IKC is a trusted entity in the wireless transmitter/receiver unit (WTRU) that has functions that are similar to some of the functions of the external NAF, in as far as its functions to derive interim key materials as well as the final Ks_local's.

Several embodiment options are proposed for the IKC. In one embodiment, the IKC serves as the terminal, in the sense that the IKC is trusted and is capable of the 'replication' of the NAF Key Center functions, as well as providing functions (such as the OTA communicating capability) and data required for the generation of the Ks_local. In another embodiment, the IKC serves as a trusted entity within the ME but separate from the terminal, and is capable of acting as a surrogate of the NAF Key Center.

Also proposed are methods based on trusted computing that together protect the integrity and usage of the IKC, enabling the IKC to securely act as a surrogate or replacement of the external network entity such as a NAF.

BRIEF DESCRIPTION OF THE DRAWINGS

A more detailed understanding of the invention may be had from the following description of an embodiment, given by way of example and to be understood in conjunction with the accompanying drawings wherein.

Figure 1:
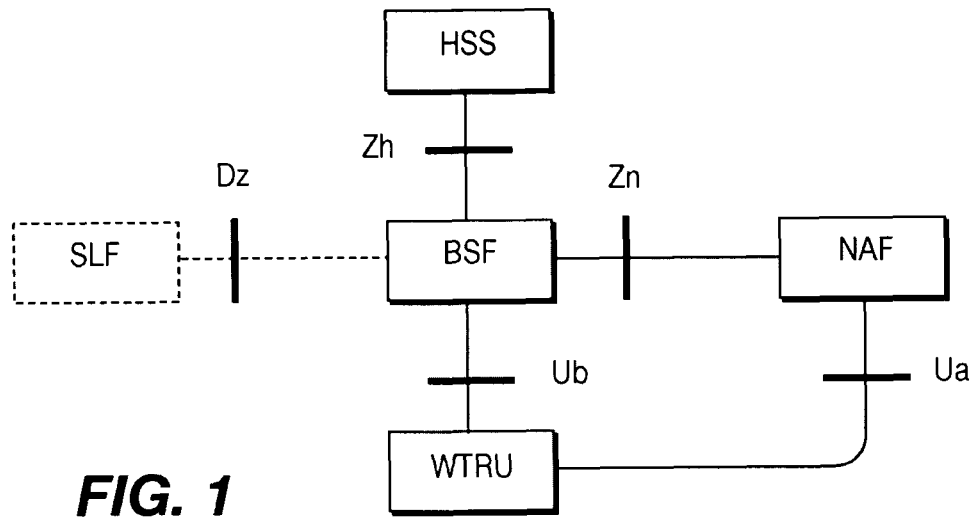
FIG. 1 shows a reference model for bootstrapping involving BSS.
Figure 2:
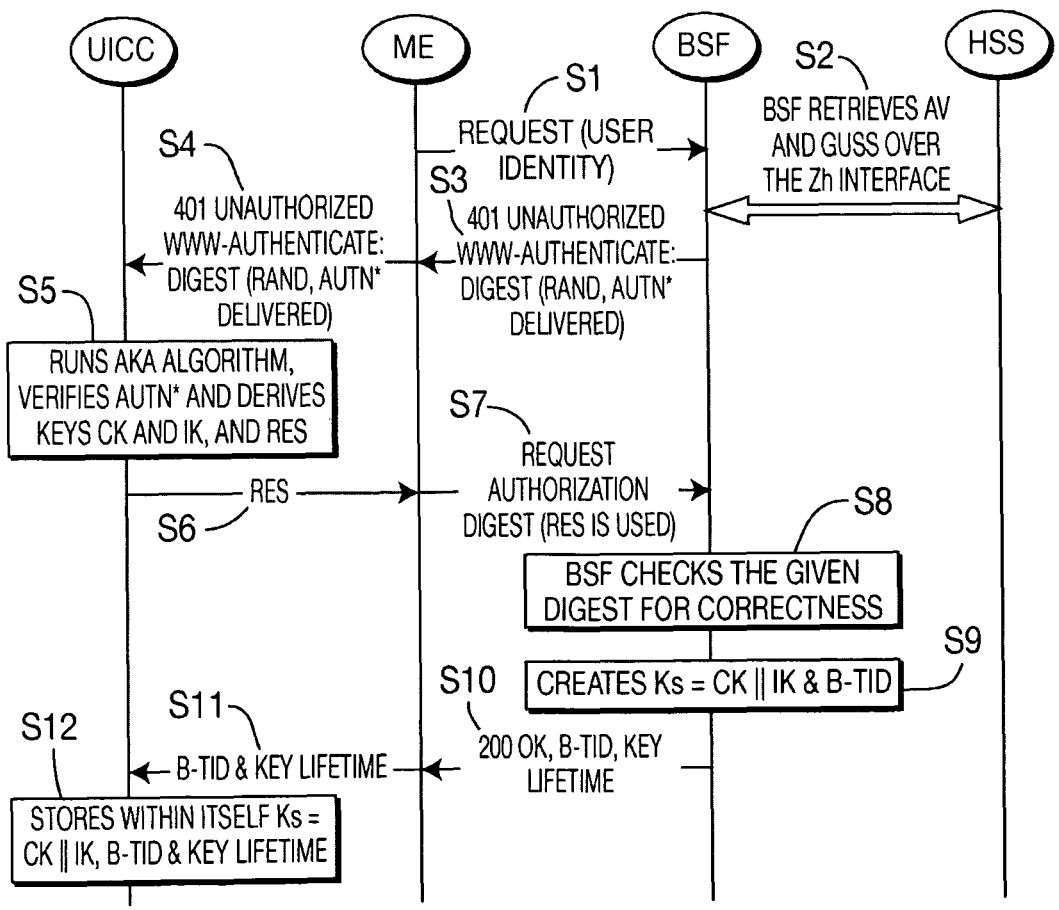
FIG. 2 shows flow chart depicting GBA_U bootstrapping procedure using UICC based enhancements.
Figure 3:
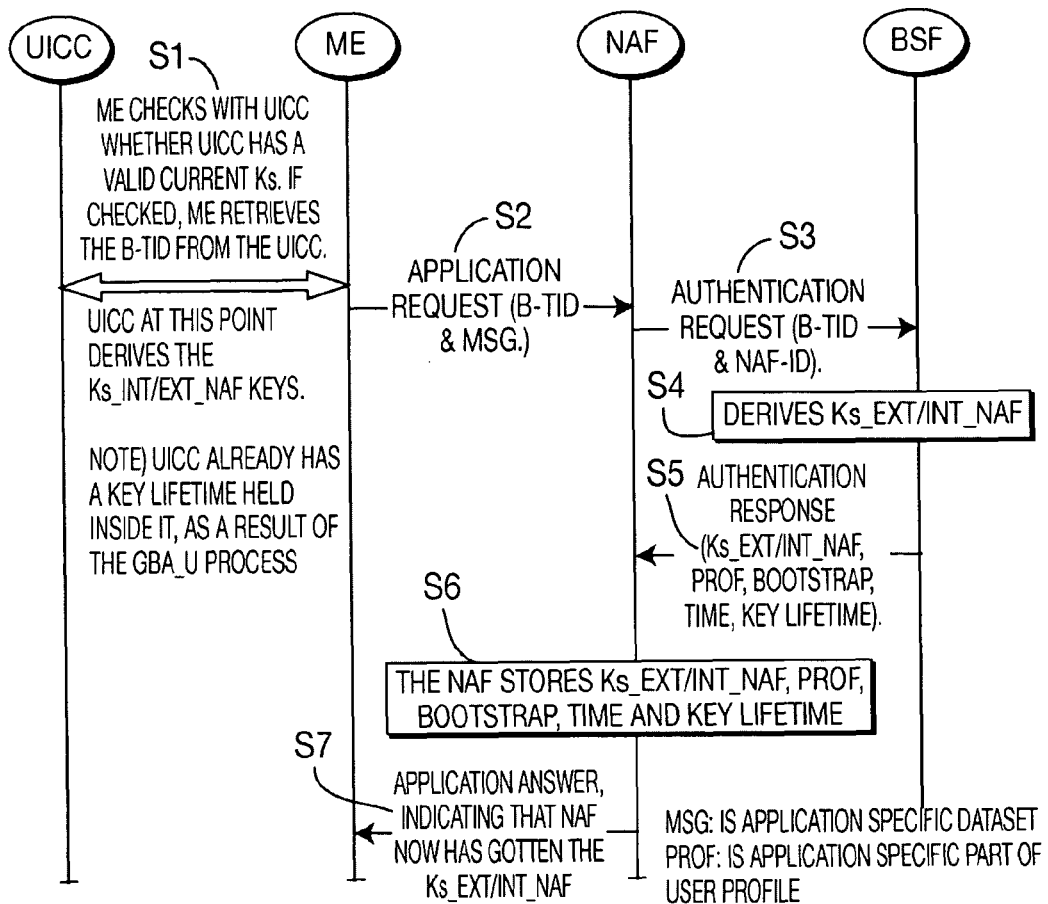
FIG. 3 shows a process for security association, after the implementation of the GBA_U.
Figure 4:
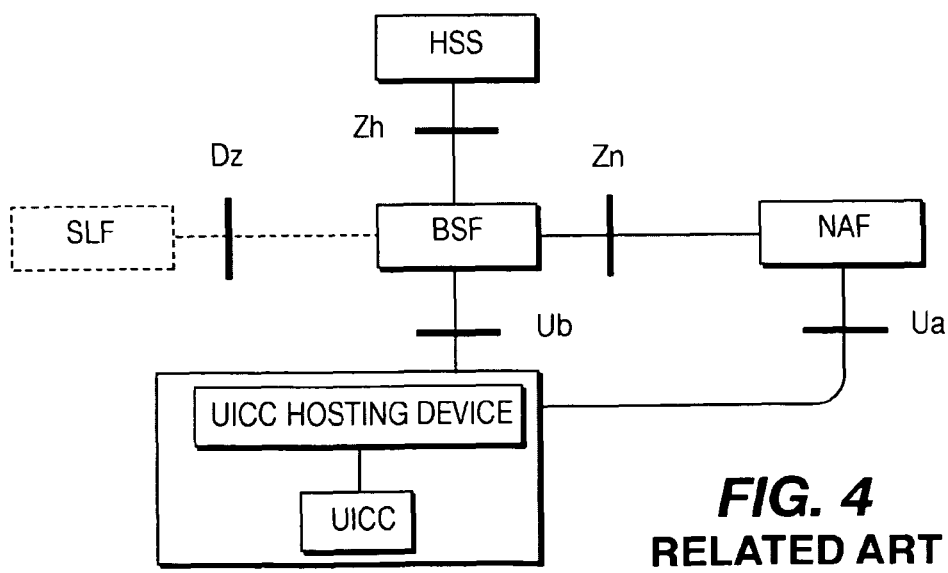
FIG. 4 shows a reference model where a terminal is a part of the UICC holding device.
Figure 5:
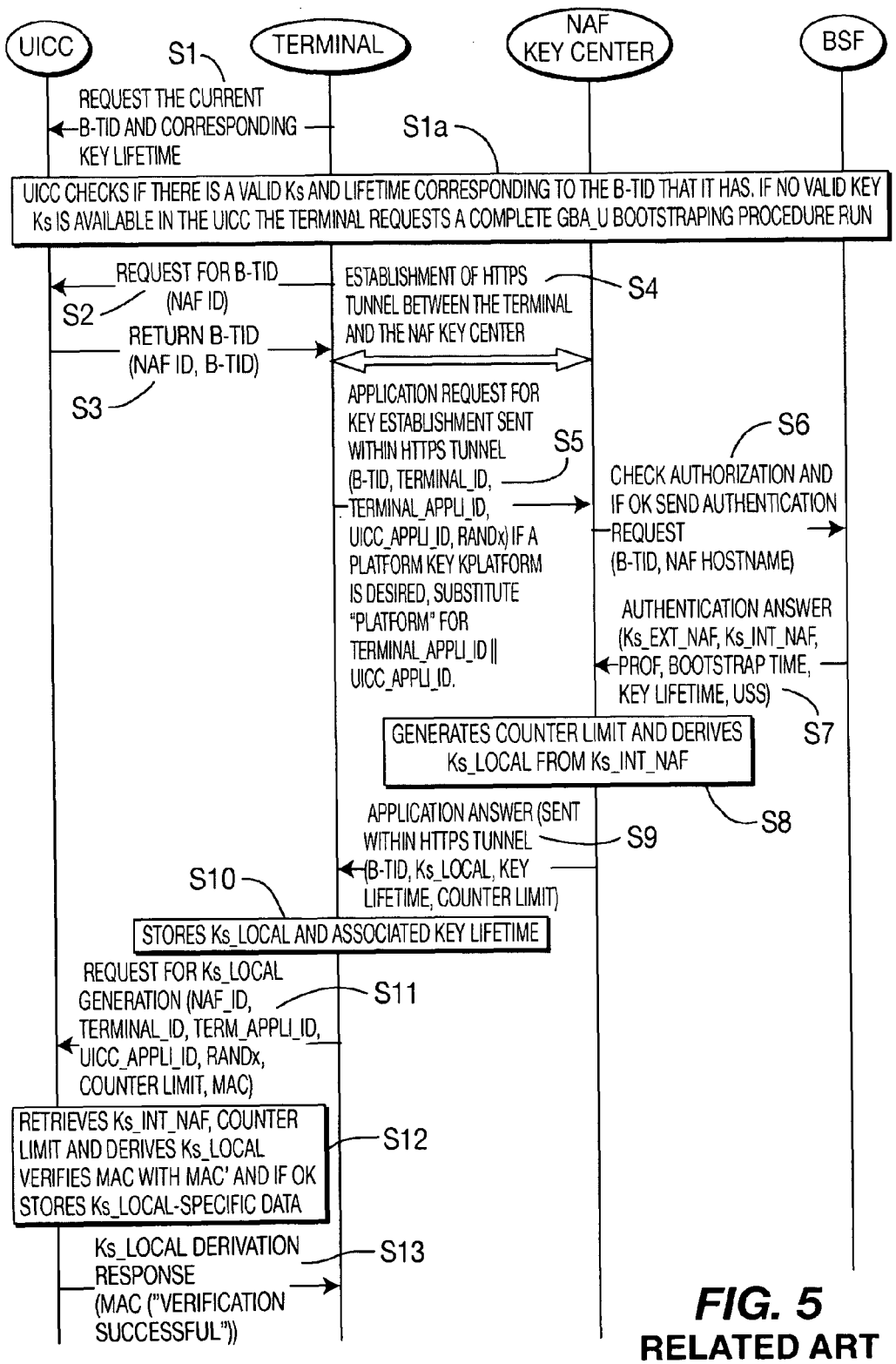
FIG. 5 shows establishment of key between UICC and a terminal.
Figure 6:
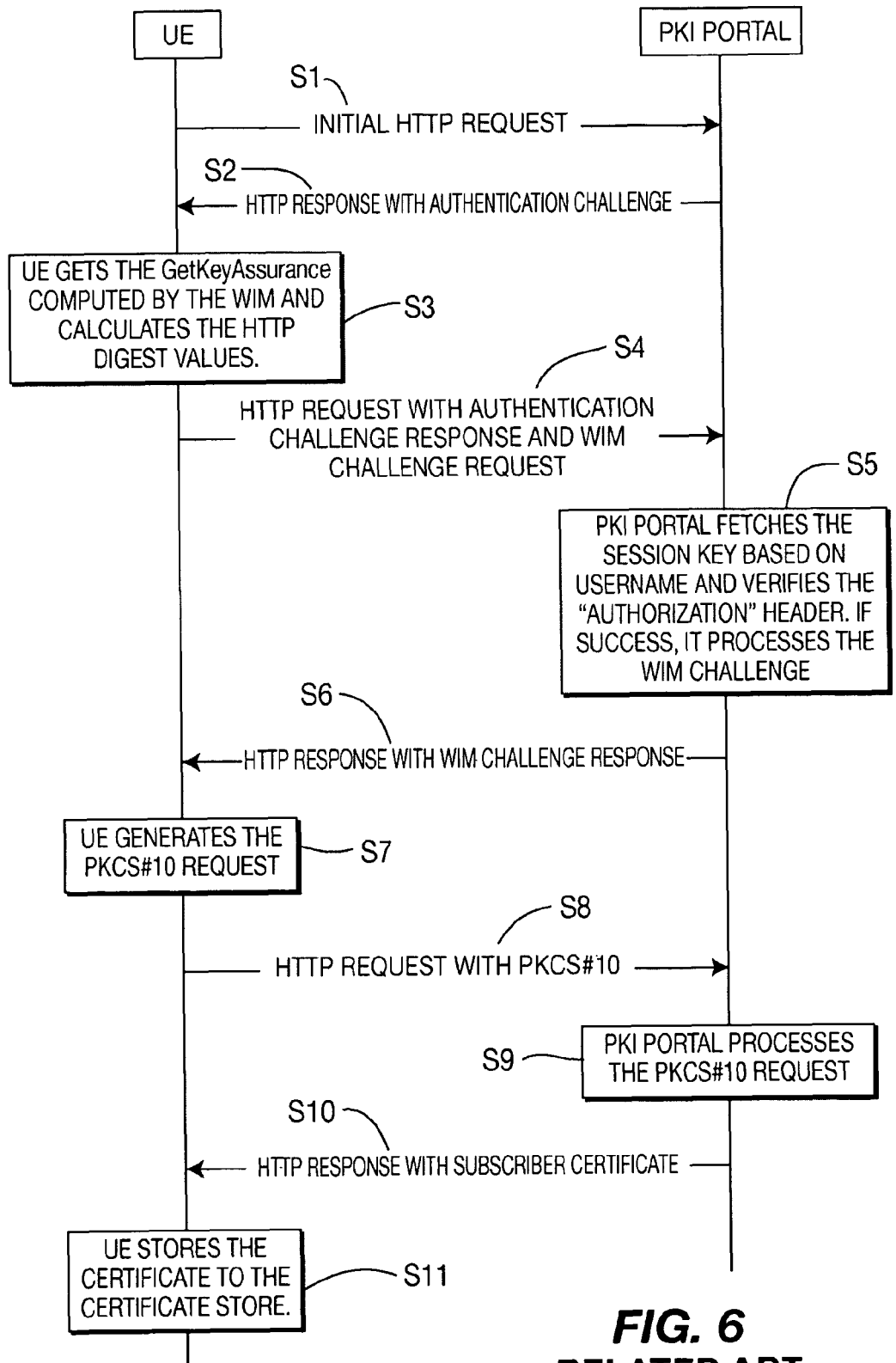
FIG. 6 shows a Certificate request using PKCS#10 with HTTP digest authentication.
Figure 7:
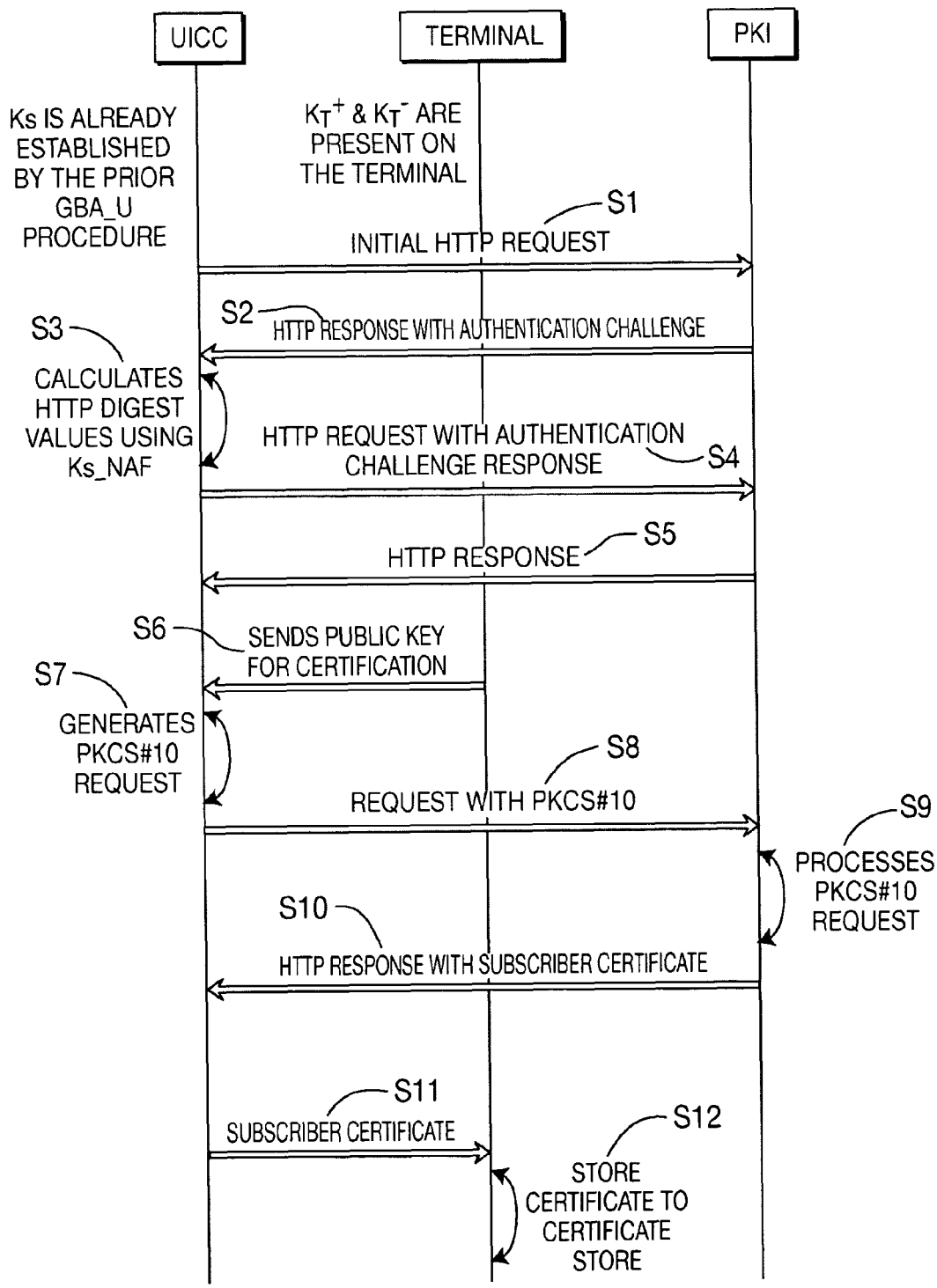
FIG. 7 shows a subscriber certificate process of scenario A1.
Figure 8:
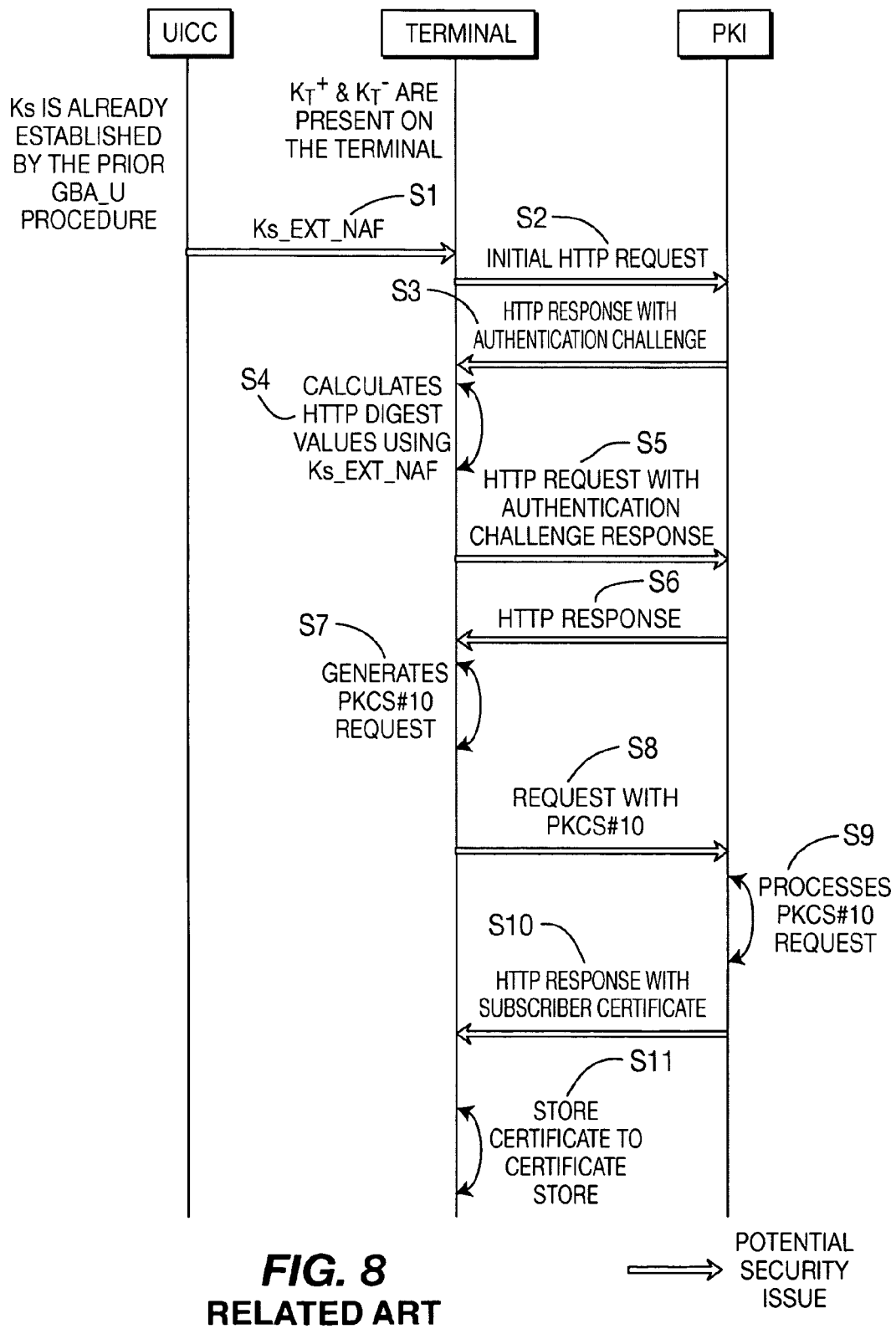
FIG. 8 shows a subscriber certificate process of scenario A2.
Figure 9:
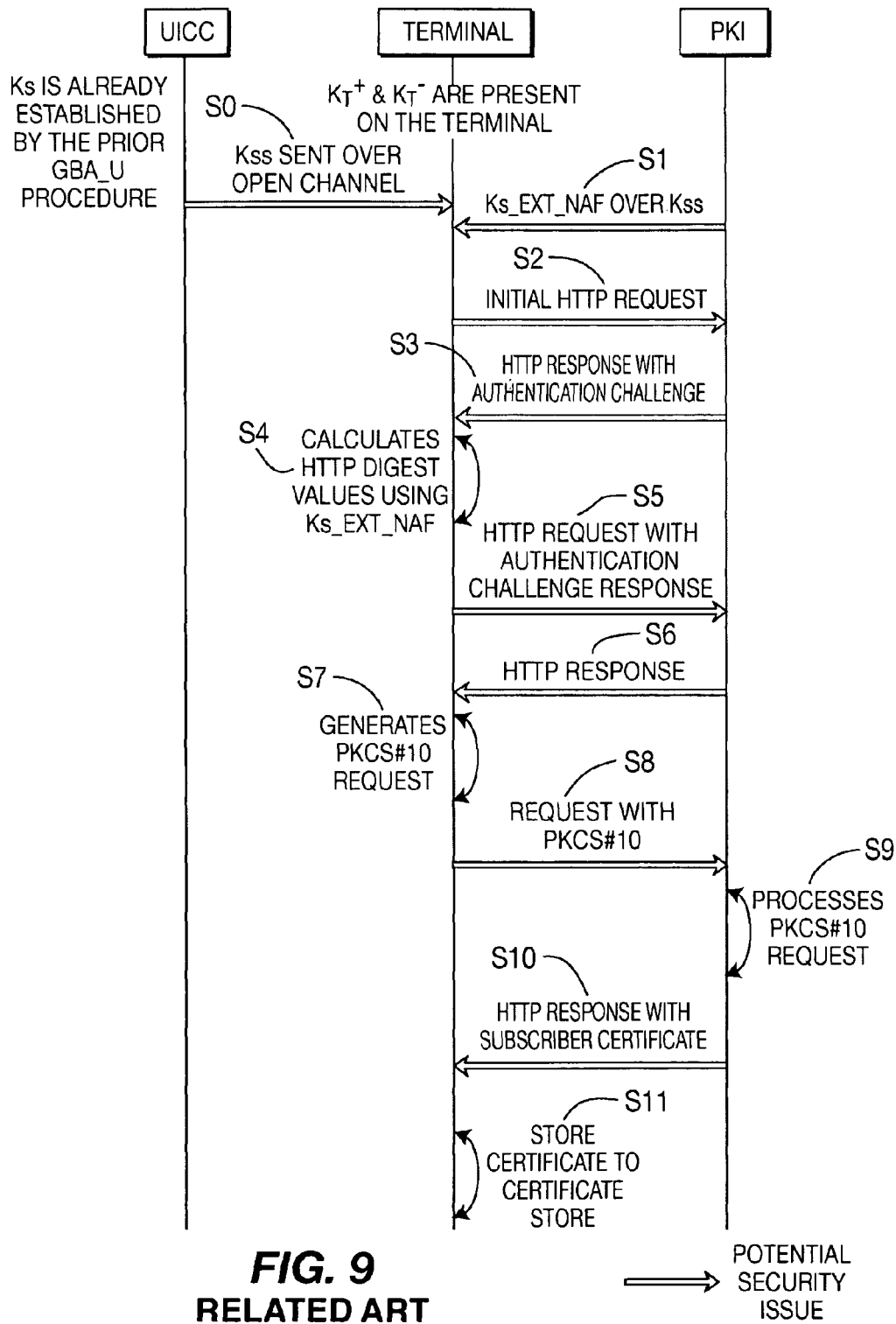
FIG. 9 shows a subscriber certificate process of scenario A3.
Figure 10:
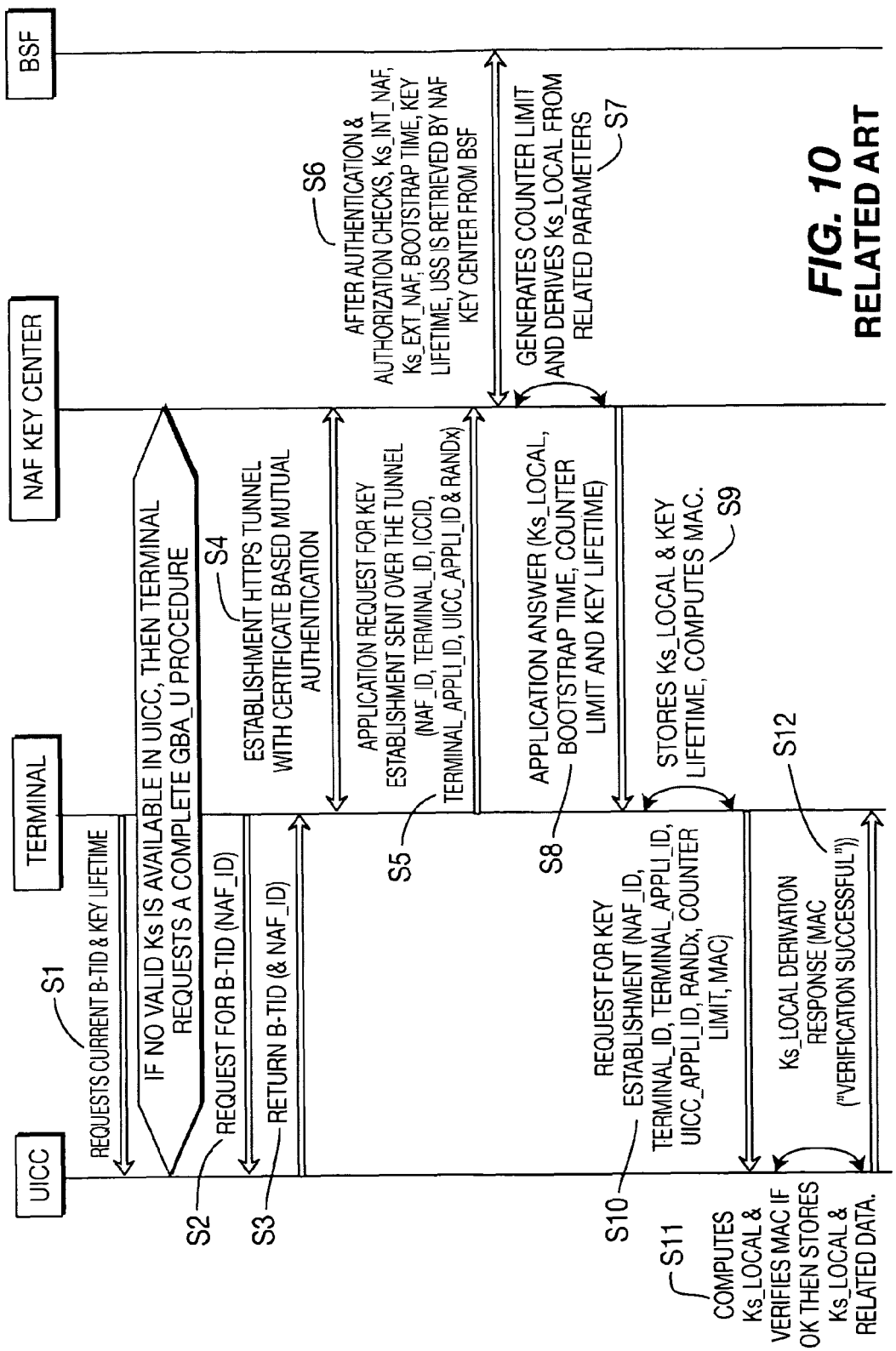
FIG. 10 shows a local key establishment process of scenario B1.
Figure 11:
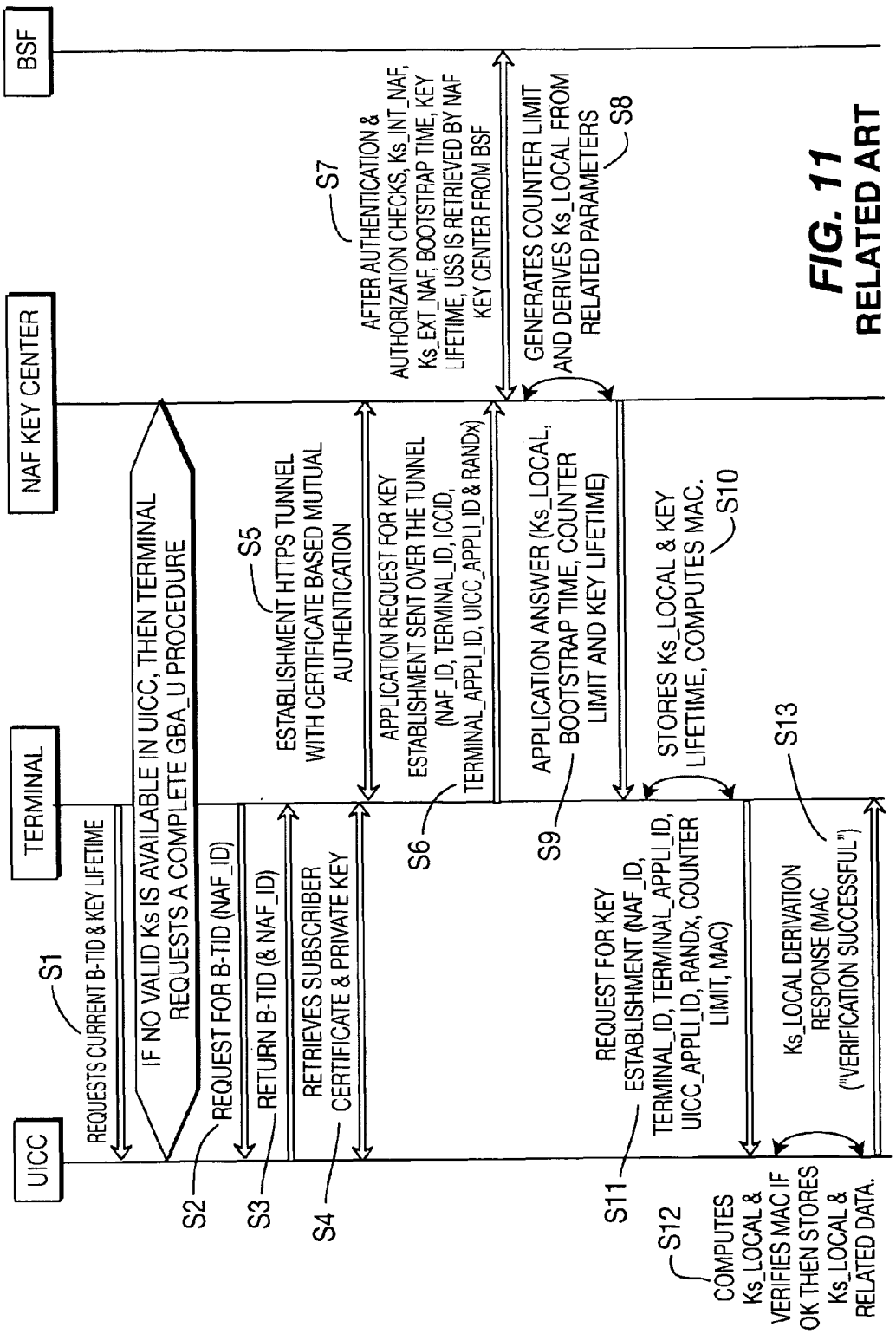
FIG. 11 shows a local key establishment process of scenario B2.

| Acronyms Used In The Specification | |
| --- | --- |
| 3GPP | 3rd Generation Partnership Project |
| AK | Anonymity Key; it is computed as AK = $f5_K$(RAND) |
| AKA | Authentication and Key Agreement |
| AUTN | Authentication token |
| AV | Authentication Vector |
| B-TID | Bootstrapping Transaction Identifier |
| BSF | Bootstrapping Server Function |
| CA | Certificate Authority |
| CK | Cipher Key |
| FQDN | Fully Qualified Domain Name |
| GAA | Generic Authentication Architecture |
| GBA | Generic Bootstrapping Architecture |
| GBA_ME | ME-based GBA |
| GBA_U | GBA with UICC-based enhancements |
| GUSS | GBA User Security Settings |
| HLR | Home Location Register |
| HSS | Home Subscriber System |
| HTTP | Hypertext Transport Protocol |
| ICCID | Integrated Circuit Card Identification |
| IK | Integrity Key |
| IKC | Internal Key Center |
| IMPI | IP Multimedia Private Identity |
| KDF | Key Derivation Function |
| K | Subscriber Authentication Key (TS33.105 sec 5.1.7.1) |
| Ks_IKC_NAF | Proposed key computed at the BSF to be used as a key material to derive local keys at both the UICC and the IKC for the secure local channel between the IKC and the Terminal. |
| Ks_ext_NAF | Derived key in GBA_U |
| $K_{IH}$ | Pre-Shared Key between IKC & HLR/HSS in our invention |
| $K_{sym\_UI}$ | Pre-Shared symmetric key between UICC and IKC |
| $K_{UH}$ | Pre-Shared Key between UICC & HLR/HSS in our invention |
| Ks_IKC_NAF | Derived at UICC and BSF to be used for derivation of NAF specific Ks_local |
| Ks_int_NAF | Derived key in GBA_U which remains on UICC |
| Ks_local | Derived key, which is shared between a Terminal and a UICC |
| MAC | Message Authentication Code |
| $MAC_{NAF}$ | MAC generated by NAF in the new invention (during Part 2) |
| $MAC_{IKC}$ | MAC generated by IKC in the new invention (during Part 3) |
| $MAC_{UICC}$ | MAC generated by UICC in the new invention (during Part 3 |
| $MAC_{UICC\_SA}$ | MAC generated by UICC in the new invention (during Part 2) |
| MNO | Mobile Network Operator |
| MTM | Mobile Trusted Module |
| NAF | Network Application Function |
| NAI | Network Access Identifier |
| OTA | Over the Air |
| PKI | Public Key Infrastructure |
| RAND | Random challenge |
| RANDx | Random challenge generated by IKC for Ks_local derivation |
| RANDy | Random challenge generated by IKC for Ks_IKC_NAF derivation |
| RES | User response |
| SLF | Subscriber Location Function |
| SQN | Sequence Number |
| $T_{IB}$ | TLS type tunnel between IKC and BSF |
| $T_{UI}$ | TLS type tunnel between UICC and IKC |
| TCG | Trusted Computing Group |
| TLS | Transport Layer Security |
| TMPI | Temporary IP Multimedia Private Identity |
| USS | User Security Setting |
| UE | User equipment |
| USIM | User Services Identity Module |
| XMAC | Expected MAC used for authentication and key agreement |
| XRES | Expected user response |

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment. In the detailed description set forth below, the term ME is synonymous with Terminal and these terms are interchangeable. UE is used to identify collectively incorporate a UICC and a Terminal (or ME). Trusted Mobile Phone is synonymous with Terminal but which is trusted in the TGC sense. Phone is synonymous with Terminal. Remote device identifies a UE wherein its UICC and a reader for the UICC are not resident in the same physical packaging containing the UE but is connected to the UE via remote connections, such as, for example, USB cables, wireless connectivity and the like.

A new method is described to resolve the problems of the prior and enhance both the security and the efficiency of the existing processes such as the GBA_U, security association, and the establishment of the local key Ks_local specific for NAFs. The method is based on the following set of assumptions or requirements.

The assumptions are as follows.

1. An Internal Key Center (IKC), which is provided as an entity inside a WTRU, has a functionality similar to that of the external NAF Key Center.
   a. In one embodiment that is considered hereafter, the IKC is also responsible for the communicating functions of the ME (to the network and the UICC). In this regard, the IKC can be considered as a terminal that has the additional functionality of the external NAF Key Center.
   b. The details of the assumed functionalities of the IKC are described below.
2. The IKC and the HLR/HSS have a pre-shared secret $K_{IH}$ pre-provisioned, possibly at the time of their manufacture or sale.
   a. The Bootstrapping Server Function (BSF) is assumed to be able to securely retrieve $K_{IH}$ from the HLR/HSS.
   b. $K_{IH}$ is used to establish a Transport Layer Security-Pre-Shared Key (TLS-PSK) tunnel between the IKC and the BSF, hereinafter referred to as tunnel $T_{IB}$.
3-A. The UICC and the HLR/HSS share a secret $K_{UH}$, which is different from the subscriber secret K that the UICC and the HLR/HSS already share between them for the existing GBA_U process.
   a. The BSF is assumed to be able to securely retrieve $K_{UH}$ from the HLR/HSS.
   b. The BSF is also assumed to be able to forward this key $K_{UH}$ to the IKC securely, encrypted, using the TLS-PSK tunnel $T_{IB}$.
   c. $K_{UH}$, once delivered to the IKC from the BSF, can be then used to establish a TLS-PSK tunnel between the UICC and the IKC, hereinafter referred to as tunnel $T_{UI}$. Tunnel $T_{UI}$ may have a security lifetime that is short, so that it can only be used for a limited amount of time.
3-B. As an alternative to assumption 3A, where the UICC and the HLR/HSS share the secret key $K_{UH}$, the UICC and the IKC can be assumed to be pre-provisioned with a pre-shared symmetric key $K_{sym\_UI}$, where such provisioning is provided at the time of manufacture or sale.
4-A. The UICC can encrypt and decrypt messages using the shared secret key $K_{UH}$.
4-B. Employing the 3-B assumption, the UICC can encrypt and decrypt messages using the pre-shared symmetric key $K_{sym\_UI}$.
5-A. The IKC can encrypt and decrypt messages using the shared secret key $K_{UH}$.
5-B. Employing the 3-B assumption, the IKC can encrypt and decrypt messages using the pre-shared symmetric key $K_{sym\_UI}$.
6. The UICC and the BSF are both capable of deriving one or more keys Ks_IKC_NAF, each specific to each of the NAFs and used in the generation of the NAF-specific Ks_local.
7. The IKC and the BSF are capable of exchanging key material for multiple NAFs in one OTA application-response exchange.
8. The BSF can, upon receipt of identification information for an IKC (hereinafter ICK_ID), identify the UICC_ID's that have either been historically authenticated or are expected to be authenticated, and use these possibly multiple UICC_IDs to identify possibly multiple correct keys $\{K_{UH}\}$ corresponding to these authenticated or expected-to-be-authenticated UICC_IDs. The BSF can also send one, several, or all of the keys in the set $\{K_{UH}\}$ to the IKC, either in parallel or in sequences, and allow the IKC to test with the hosted UICC which of these keys should be used with the hosted UICC.
9. A mobile trusted module (MTM) meeting the specifications of the TCG Mobile Trusted Module specification v1.0 and its associated software stack is resident in the WTRU, and the UE is a trusted mobile phone meeting the specifications of the TCG Trusted Mobile Phone Reference Architecture specification. The MTM is responsible for creation, checking and verifying the state of the IKC and the UICC, and also for the secure storage of keys and data that the IKC handles for the GBA_U, security association, and secure local key establishment procedures.

The Internal Key Center (IKC)

The IKC, in one implementation, is a part of the Terminal and is capable of communicating over-the-air employing the 3G air interface and ultimately with the BSF. In an alternative implementation, the IKC can be an entity separate from the Terminal. The IKC is a trusted component, whose integrity and trustworthiness is verifiable by the MTM in the WTRU. The MTM, in one implementation, is part of the Terminal (or WTRU). In implementations having both an MTM and an IKC as part of the Terminal (or WTRU), wireless connectivity may be replaced by wired connectivity. The IKC has cryptographic capabilities to establish TLS type tunnels between itself and the UICC, as well as with the BSF. The tunnels are used to protect the integrity and confidentiality of the information being exchanged in the GBA_U procedure and the security association, and also during the establishment of a secure channel between the UICC and the Terminal. The IKC is capable of establishing a TLS-PSK tunnel with the BSF. The BSF is assumed to be capable of supporting such a tunnel with the IKC. During the Part 1 and Part 2 phase of our proposed version, the IKC performs functions required of the terminal for the execution of the prior-art GBA_U and Security Association procedures as well as functions required for the creation and usage of two TLS tunnels, one between the IKC and the UICC, and the other between the IKC and the BSF. During Part 3 of our technique, the IKC executes functions that are similar to functions performed by an external NAF key center. These functions include: 1) generation of the counter limit; 2) generation of one or more pairs of random numbers RANDx(s) and RANDy(s), each specific to a NAF and used to derive a NAF-specific Ks_local; 3) derivation of the Ks_local using the KDF; and 4) forwarding of the Ks_local to the Terminal, in the case where the IKC is an entity separate from the Terminal.

Figure 12A:
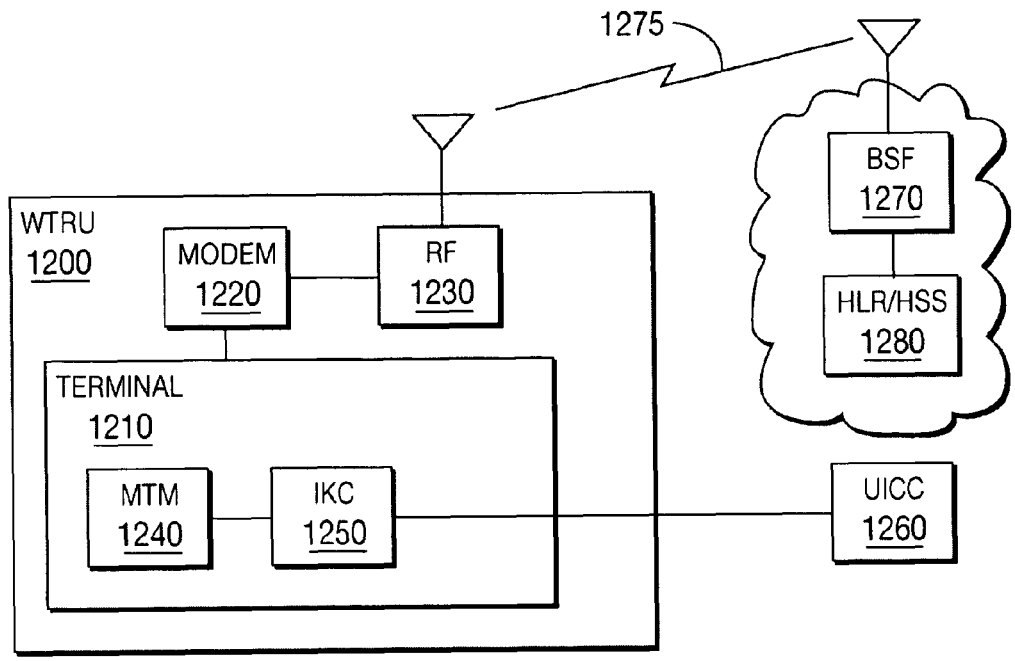
FIG. 12a shows an example block diagram of a secure wireless communication system.

FIG. 12a shows an example block diagram of a secure wireless communication system configured according to the above stated assumptions. The wireless communication system includes a WTRU 1200. The WTRU 1200 includes a terminal 1210, a modem 1220, and a radio (RF) unit 1230. The terminal 1210 includes a mobile trusted module (MTM) 1240 and an internal key center (IKC) 1250. The IKC unit 1250 is configured to communicate with an external UICC 1260. The RF unit 1230 is configured to communicate with a bootstrap server function (BSF) 1270 over an air interface 1275. The BSF 1270 is in communication with an HLR/HSS 1280, and optionally other network application functions (NAFs) (not pictured).

The improved key derivation and security association (SA) using the IKC procedure is divided into three parts, as set forth below.

Figure 12B:
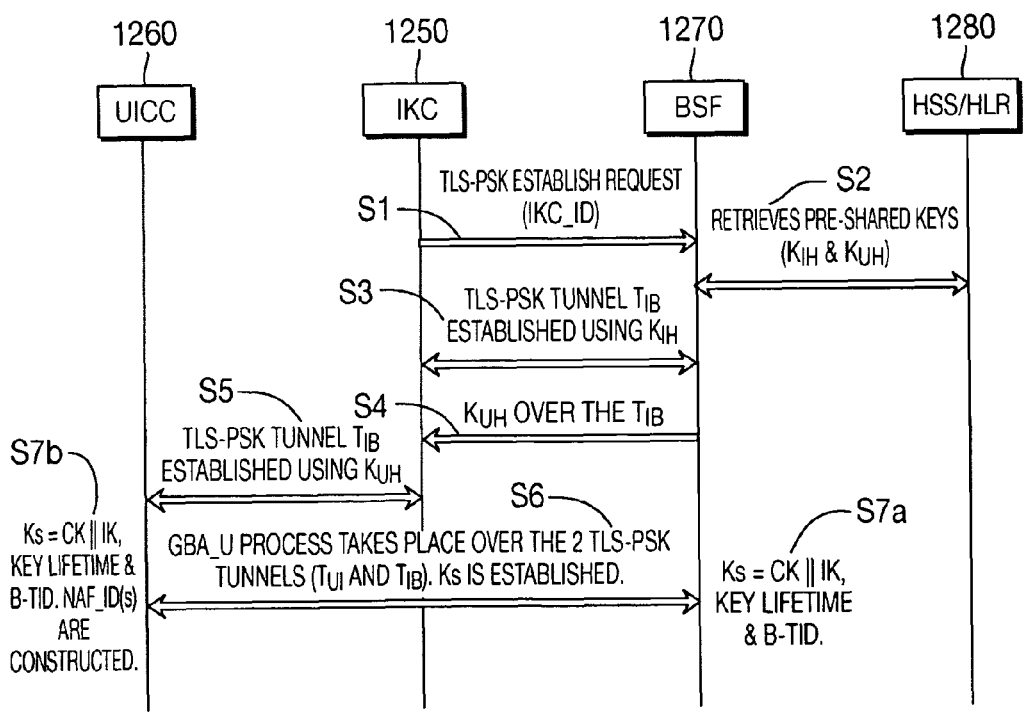
FIG. 12b shows a case when UICC and HLR/HSS share $K_{UH}$.

The first part of the procedure (Part-1), uses an improved GBA_U process in accordance with a first embodiment as shown in FIG. 12b. One improvement over prior methods is that the process is now executed over two TLS-type channels under the control of the newly proposed entity IKC 1250 within the WTRU 1200. Referring to FIG. 12b, at step S1, the IKC 1250 sends a request for the establishment of the TLS-PSK tunnel between IKC 1250 and the BSF 1270. The request message includes IKC 1250_ID as a payload. Next, the BSF 1270, at S2, retrieves the Pre-Shared Keys ($K_{IH}$ and $K_{UH}$) from the HSS/HLR. $K_{IH}$ is used to establish a TLS-PSK tunnel between IKC 1250 and the BSF 1270, whereas $K_{UH}$ is used to establish a tunnel between UICC 1260 and IKC 1250. The TLS-PSK tunnel ($T_{IB}$) between IKC 1250 and BSF 1270 is established at S3, where pre-shared secret ($K_{IH}$) based mutual authentication is employed. The BSF 1270, at S4, sends $K_{UH}$ over the tunnel $T_{IB}$ to the IKC 1250. The UICC 1260 and IKC 1250, at S5, establish a TLS-PSK tunnel ($T_{UI}$), using pre-shared secret ($K_{UH}$) based mutual authentication. The GBA_U takes place which leads to establishment of Ks at both the UICC 1260 and the BSF 1270. Finally, at the end of the GBA_U procedure Ks=CK||IK is established at the BSF 1270 (see S7a) and the UICC 1260 (see S7b). NAF_ID is also constructed at the UICC 1260 as follows: NAF_Id=FQDN of the NAF||Ua security protocol identifier. In this procedure, the UICC 1260 is assumed to share a secret key $K_{UH}$ with the HLR/HSS 1280.

Figure 13:
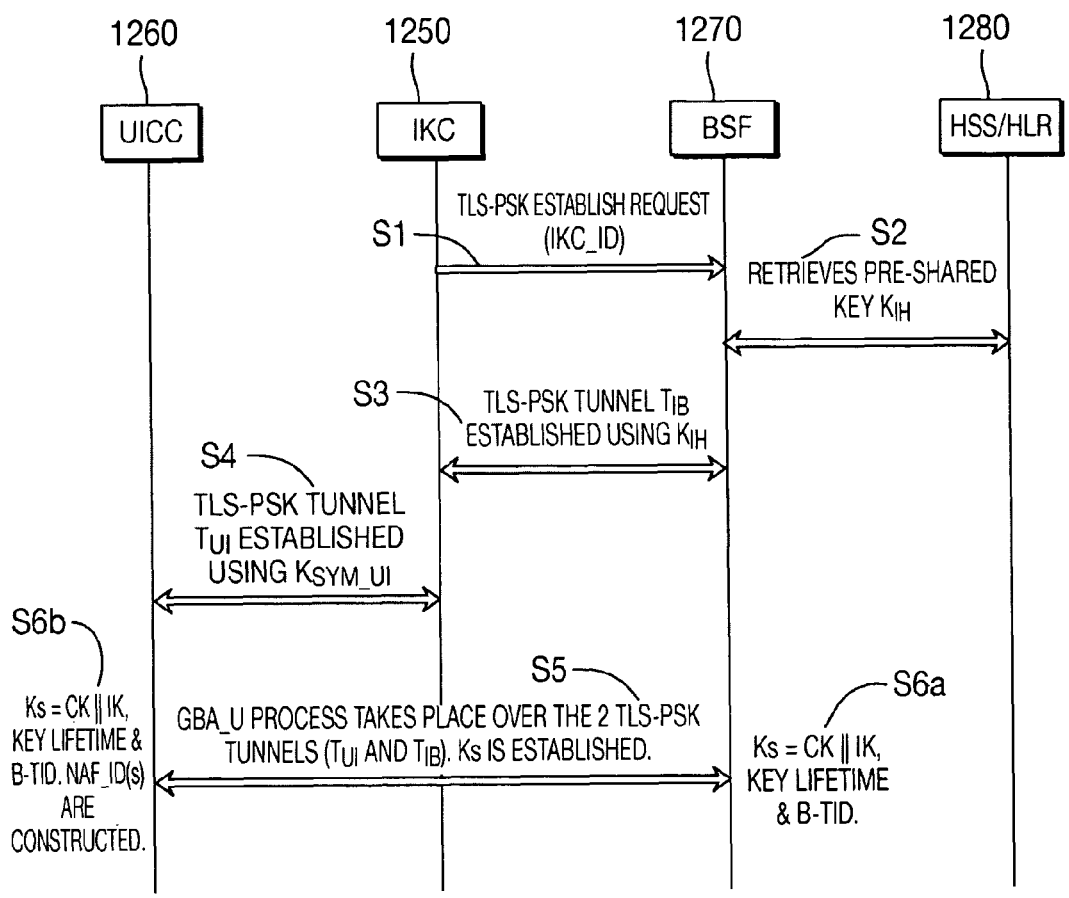
FIG. 13 shows an embodiment when UICC and IKC share symmetric secret key $K_{sym\_UI}$.

As an alternative, FIG. 13 depicts steps for a modified GBA_U where the UICC 1260 shares a pre-provisioned symmetric secret key $K_{sym\_UI}$ directly with the IKC 1250 (see S4). Only those steps which differ from FIG. 12b will now be described. At S2 only the shared key $K_{IH}$ is provided to the BSF 1270. S4 of FIG. 13 establishes a TLS-PSK tunnel using $K_{sym\_UI}$. S5 of FIG. 13 is the same as S6 in FIG. 12b. Steps S6a and S6b in FIG. 13 are the same as S7a and S7b in FIG. 12b. The alternative procedure in FIG. 13 has a drawback, in that the requirement of the UICC 1260 and the IKC 1250 to directly share a pre-provisioned secret key $K_{sym\_UI}$ may unnecessarily create a strong 'binding' between a particular UICC 1260 and a particular IKC 1250, such that portability of the UICC 1260 to be hosted in different types of devices described above can become more difficult to implement or manage.

Figure 14:
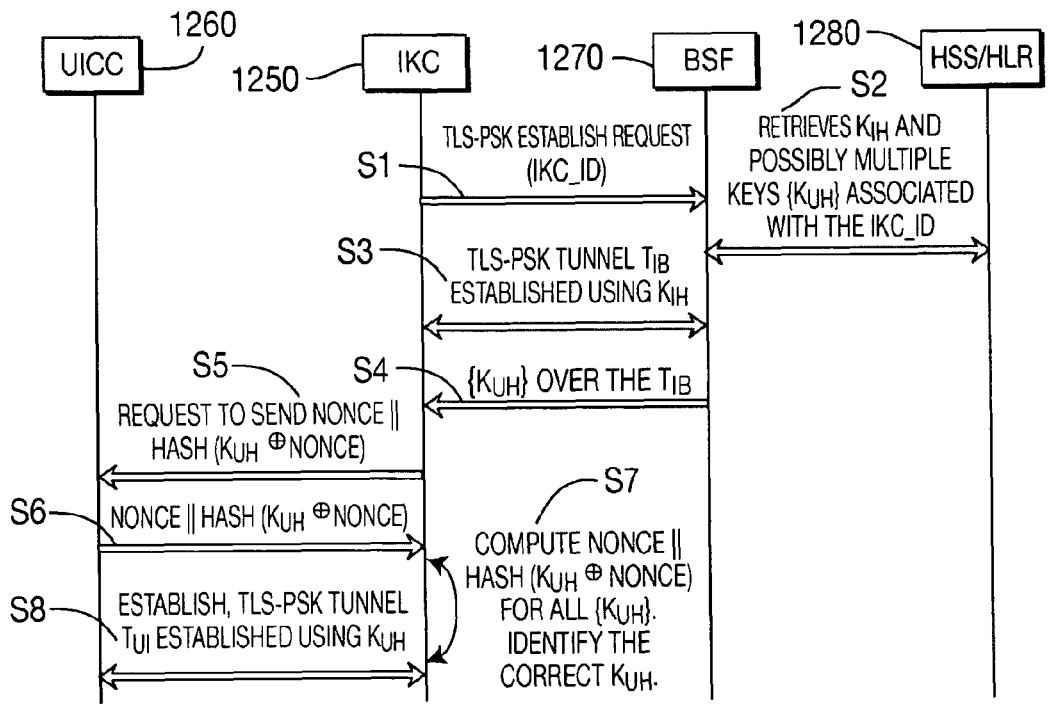
FIG. 14 shows a process for identification of correct $K_{IH}$ performed by the IKC, and subsequent TLS-PSK tunnel establishment.

In the procedure shown in FIG. 12b, the BSF 1270 is configured to collect, if necessary, a plurality of keys {$K_{UH}$}, corresponding to the UICC 1260s, which the HLR/HSS 1280 may have knowledge of, as either having been associated, or expected to be associated with, a given IKC 1250. The BSF 1270 can send these multiple keys and the IKC 1250 can then perform a challenge-response-type key-validation procedure with the UICC 1260, until the right key $K_{UH}$ is identified. An embodiment of this procedure is depicted in FIG. 14. Only those steps which differ from FIG. 13 will be described, step S2 provides both $K_{IH}$ multiple keys {$K_{UH}$} to the BSF 1270. The IKC 1250 requests (S5) and then receives (S6) nonce||hash ($K_{UH}$⊕nonce) from the UICC 1260. Each $K_{UH}$ is calculated (S7) to find the correct $K_{UH}$ to establish a TLS-PSK tunnel $T_{UI}$ with the UICC 1260.

Figure 15:
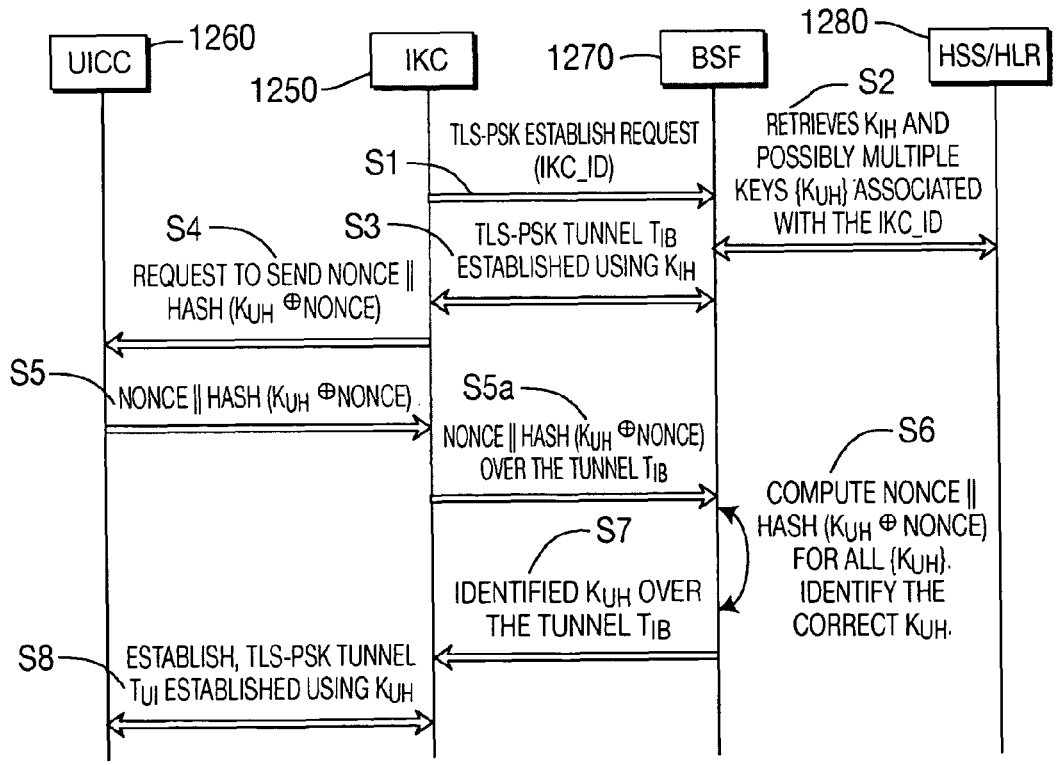
FIG. 15 shows a process for identification of correct $K_{IH}$ performed by the BSF, and subsequent TLS-PSK tunnel establishment.

As an alternative to the process described in FIG. 14, we propose a key validation technique where the IKC 1250 does NOT receive all of the possible keys $K_{UH}$ from the BSF 1270. Rather, the IKC 1250 receives evidence the key $K_{UH}$ from the UICC 1260 (see FIG. 15, steps S4 and S5), and passes it to the BSF 1270 (S6), which then performs the procedure to identify the correct key out of the possible set of keys {$K_{UH}$}, as shown at S6 of FIG. 15. The correct $K_{UH}$ is passed to the IKC 1250 (S7) for use in establishing the TLS-PSK tunnel with the UICC 1260. This method has an advantage over the method depicted in FIG. 14, in that the BSF 1270 does not risk OTA disclosure of multiple candidate keys.

In the TLS-PSK tunnel establishment procedure depicted in FIG. 12b, the initial information transfer from the IKC 1250 to the BSF 1270 of the IKC 1250_ID is currently performed only on a physical-layer protection (that is, protected by UIA and UEA session keys). If, as described earlier, such session keys are vulnerable to eavesdropping, the IKC 1250_ID will become vulnerable to eavesdropping as well, resulting in privacy disclosure.

An optional step may be employed in FIG. 14 to protect the identity of the IKC 1250, wherein the IKC 1250 and the BSF 1270 use a public-key based encryption and decryption of the IKC 1250_ID, as well as other information exchanged during the TLS-PSK tunnel establishment process. In place of a certificate based approach, which may be cumbersome or vulnerable to security risk, it is proposed that the IKC 1250 and the BSF 1270 establish the respective public keys using a Diffie-Hellman (DH) key exchange procedure. In fact, the IKC 1250 may obtain and choose one from a fairly large number n of different public keys, which are broadcast from the network. The DH key exchange protocol can be used for this purpose.

The communicants apply this protocol to compute a common index, such as a, into the public key set. In order to accomplish this, first, the network and the IKC 1250 agree on two values which are publicly known: a very large prime number P and a generator g of the multiplicative group $F_p^*$ of the field $F_p$. The network then selects the random number $RAND_i$, computes $g_{RAND_i} \equiv g^{RAND_i} \mod p$, and sends $g_{RAND_i}$ to the IKC 1250 ($1 \leq RAND_i \leq p-2$). The IKC 1250 then computes the random number FRESH, computes $g_{FRESH} \equiv g^{FRESH} \mod p$, and sends $g_{FRESH}$ to the network ($1 \leq FRESH \leq p-2$). Then, the network computes $k \equiv g_{FRESH}^{RAND_i} \mod p$ Finally, the IKC 1250 computes $k' \equiv g_{RAND_i}^{FRESH} \mod p$ It is easily shown that k≡k' mod p. The IKC 1250 and network, both having calculated k ($0 \leq k \leq p$), can compute the secret index a of the public key by simply reducing k modulo n. That is, a≡k mod n. Using the public key $k_a$, the public key corresponding to the index a, the IKC 1250 encrypts the message containing IKC 1250_ID and the network uses the secret key corresponding to $k_a$ to decrypt that message.

The confidentiality of IKC 1250_ID is achieved because the network is the sole possessor of $RAND_i$ and the IKC 1250 is the sole possessor of FRESH; only these two communication participants can compute k. An attacker is missing both of these random values which are protected by the computational infeasibility of the discrete logarithm problem.

A message mechanism is implied with respect to the dissemination of the public key set. It could easily be part of the cell broadcast messaging structure. However, additional message mechanisms are required for the transmission of $g_{RAND_i}$ from the network to the IKC 1250 and the value $g_{FRESH}$ from the IKC 1250 to the network. These mechanisms preferably include the network/IKC 1250 agreement process for the public values P and g defined above.

With regard to the network transferring multiple keys, designated $K_{UH}$, to IKC 1250, an iterative mutual (challenge-response) authentication process can be used, one for each key, until a successful $K_{UH}$ is achieved. The UICC 1260 is rejected if the authentication fails for all keys.

The above-described DH exchange of public keys may also be performed as a part of the TLS-PSK tunneling establishment process itself. In this case, the IKC 1250_ID will be included in the initial exchange messages from the IKC 1250 to the BSF 1270 in the TLS-PSK handshake process. It is noted here that the RFC 4279 for the TLS-PSK extension allows four different cipher-suites for DH-enabled TLS-PSK procedures, which are:
1. TLS_DHE_PSK_WITH_RC4_128_SHA
2. TLS_DHE_PSK_WITH_3DES_EDE_CBC_SHA
3. TLS_DHE_PSK_WITH_AES_128_CBC_SHA
4. TLS_DHE_PSK_WITH_AES_256_CBC_SHA Due to the known cipher-strength issues of the RC4 algorithm, only the latter 3 cipher-suites with 3DES, AES128, or AES256, respectively, should be used.

Part-2: The Security Association Between the NAF and the UE

Part-2 is a Security Association process which is superior to a process of the same name in the prior art through the use of the two (2) TLS-PSK tunnels to secure the exchange of the information between the UICC 1260 and the IKC 1250, and between the IKC 1250 and the BSF 1270. An additional improvement is that the UICC 1260 can establish keys with multiple NAFs in a bulk key-establishment mechanism, with the help of the IKC 1250 and the BSF 1270

Figure 16:
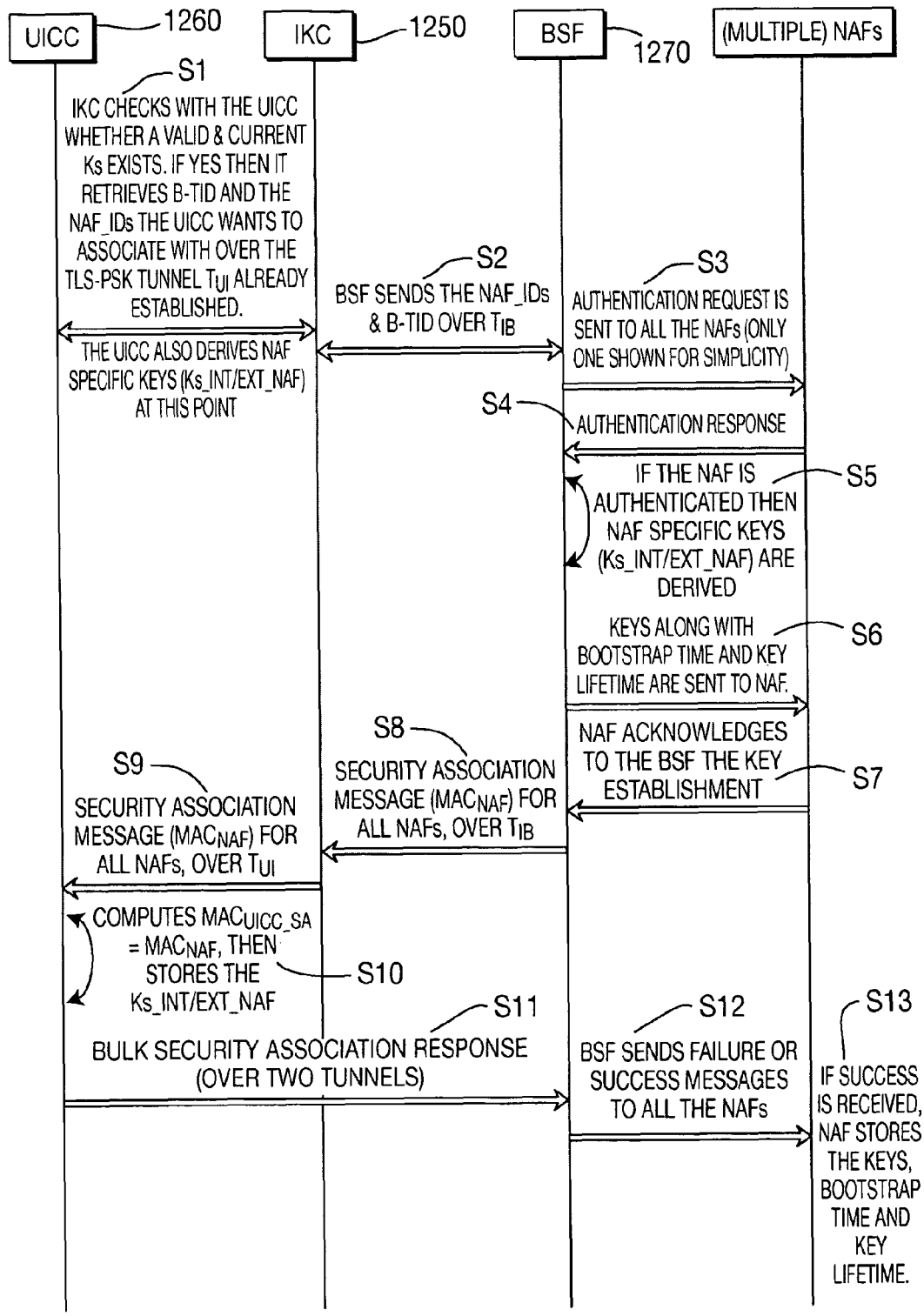
FIG. 16 shows a security association between NAFs and a WTRU described in this disclosure.

Referring to FIG. 16, the detailed steps of Part-2 are shown. IKC 1250, at S1, checks whether a current and valid Ks exists at the UICC 1260, if yes, the IKC 1250 retrieves the B-TIDs and NAF_IDs (or some other identity of the NAFs with whom the UICC 1260 wants to establish security association) from the UICC 1260 over the already established tunnel ($T_{UT}$). The UICC 1260 also derives Ks int/ext_NAF keys during S1. If the Ks is not current or valid, GBA_U is initiated for the establishment of Ks. IKC 1250, at S2, forwards NAF_IDs and B-TID to the BSF 1270 over tunnel $T_{IB}$. The BSF 1270, at S3, sends an authentication request to the desired NAFs (only one NAF is shown in FIG. 16 for simplicity). The BSF 1270, at S4, receives authentication responses from the NAFs. If the NAFs are authenticated, the BSF 1270, at S5, derives NAF specific keys (Ks_int/ext_NAF). The BSF 1270, at S6, forwards the Ks_int/ext_NAF keys along with bootstrap time and key lifetime to the all the NAFs. At S7, each of the NAFs sends to the BSF 1270 an acknowledgement message indicating the receipt of the Ks_int/ext_NAF, key lifetime, and bootstrap time. The BSF 1270 aggregates these messages and, at S8, sends a bulk security association message to the IKC 1250 over the TLS-PSK tunnel $T_{IB}$, which contains multiple $MAC_{NAFs}$, each corresponding to a particular NAF for which Ks_int/ext_NAF had been established in steps S5 through S7. For each of the $MAC_{NAF}$ messages, $MAC_{NAF}$=HMAC-SHA-256(Ks_ext_NAF||Ks_int_NAF||NAF_ID||GUSS) is truncated to 16 octets for each NAF. The IKC 1250, at S9, forwards the bulk security association message received from the BSF 1270 during step S8 to the UICC 1260 over the TLS-PSK channel $T_{UT}$. The UICC 1260, at S10, computes, for each NAF, a $MAC_{UICC\_SA}$ that is specific to that NAF, such that $MAC_{UICCSA}$=HMAC-SHA-256(Ks_ext_NAF||Ks_int NAF||NAF_ID||GUSS) truncated to 16 octets. A bulk security association response message is created by the UICC 1260, at S11, which includes all successes and/or failures of the security association between the UICC 1260 and all of the NAFs. A failure is detected when $MAC_{IKC}$ does not match its corresponding $MAC_{UICC\_SA}$ for any of the NAFs. The failure is indicated by a string, for example, such as "security association failure" ||NAF_ID. A success is detected when $MAC_{IKC}$ matches its corresponding $MAC_{UICC\_SA}$. The success response contains a message authentication code (MAC) of the ASCII-encoded string "Security Association Successful" using the key Ks_int/ext_NAF and the MAC algorithm HMAC-SHA-256 truncated to 16 octets. The Bulk Security Association Response message is sent over to the BSF 1270, at S11, via the IKC 1250 over the $T_{UT}$ and $T_{IB}$ tunnels. The BSF 1270, at S12 sends to each of the NAFs, the failure or success status of the security association attempt specific to that NAF. All the NAFs which have received a success status, at S13, store the keys (Ks_int/ext_NAF), bootstrap time, and associated key lifetime.

Part-3: The key establishment between a terminal and a UICC 1260 (Ks_local)

The Part-3 is the process of local key establishment between the UICC 1260 and the Terminal. The advantages of this part, compared with the prior art, are as follows: The use of the two TLS-PSK tunnels which secure the exchange of the information between the UICC 1260 and the IKC 1250, and between the IKC 1250 and the BSF 1270. Secondly, the UICC 1260 and the Terminal, with the help of the IKC 1250 and the BSF 1270, establish multiple local keys, each specific to a different NAF, without the Terminal having to establish multiple OTA connections with the different external NAF key centers, as is required in the prior art.

Figure 17:
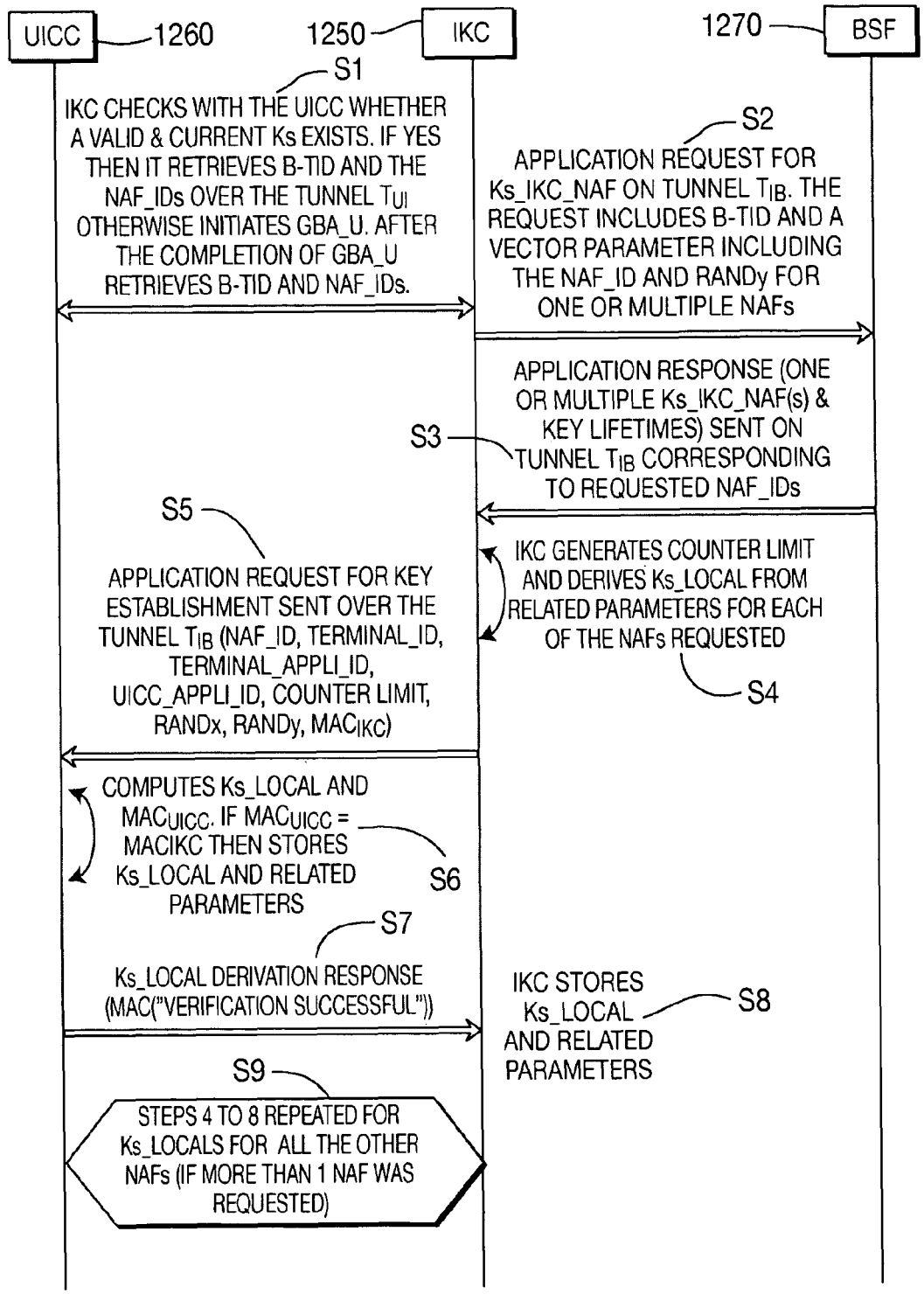
FIG. 17 shows a process for Ks_local establishment between UICC and Terminal)

FIG. 17 shows the detailed steps of Part-3. The IKC 1250, at S1, checks whether a current and valid Ks exists on UICC 1260. If positive, the IKC 1250 retrieves the B-TID and one or more NAF_IDs from the UICC 1260. When there is no current or valid Ks, a new GBA_U process is initiated to establish a Ks, after which the B-TID and one or more NAF_IDs are retrieved by the IKC 1250 from the UICC 1260. All of the information exchange between the UICC 1260 and the IKC 1250 required for the above procedures is provided over the TLS-PSK tunnel $T_{UT}$. The IKC 1250, at S2, sends an application request to the BSF 1270 for one or more keys Ks_IKC 1250_NAFs, each corresponding to the NAF_ID of the NAF requested. The IKC 1250 also sends the B-TID, and one or more NAF_IDs along with corresponding RANDy nonces over the TLS-PSK tunnel $T_{IB}$. The BSF 1270 computes one or more IKC 1250 keys Ks_IKC 1250_NAF(s), each specific for each of the NAFs requested, wherein: Ks_IKC 1250_NAF=KDF (Ks_int_NAF, RANDy). Then, the BSF 1270, at S3, sends an application response containing all of the Ks_IKC 1250_NAF keys and their respective (NAF-specific) key lifetimes to the IKC 1250. The IKC 1250, at S4, generates the counter limit values (each specific to an associated one of the requested NAFs) and derives one or more local keys Ks_local(s), where Ks_local=KDF (Ks_IKC 1250_NAF, B-TID, Terminal_ID, ICCID, Terminal_appli_ID, UICC_appli_ID, RANDx, Counter Limit). It should be noted that in the case where the local key is a platform specific key, the UICC_appli_ID and the Terminal_appli_ID octet strings are set equal to the static ASCII-encoded string "platform". The IKC 1250, at S6, sends an application request message to the UICC 1260, over the tunnel $T_{UT}$, requesting the UICC 1260 to create a Ks_local specific to a NAF_ID. The payload of this request contains the NAF_ID, the Terminal_ID, the Terminal_appli_ID, the UICC_appli_ID, RANDx, RANDy, and the Counter Limit value. The Terminal also includes a $MAC_{IKC}$ which is computed as $MAC_{IKC}$=HMAC-SHA-256(Ks_local, NAF_ID||Terminal_ID||ICCID||Term_appli_ID||UICC_appli_ID||RANDx||RANDy||Counter Limit) truncated to 16 octets. It should be noted that in the case where this is a platform specific key, the UICC_appli_ID and the Terminal_appli_ID octet strings are set to be equal to the static ASCII-encoded string "platform". The UICC 1260 retrieves the Ks_int_NAF and B-TID associated with the received NAF_ID, initially derives Ks_IKC 1250_NAF according to Ks_IKC 1250_NAF=KDF (Ks_int_NAF, RANDy) and then derives Ks_local, wherein Ks_local=KDF (Ks_IKC 1250_NAF, B-TID, Terminal_ID, ICCID, Terminal_appli_ID, UICC_appli_ID, RANDx, Counter Limit). The UICC 1260, at S6, verifies the $MAC_{IKC\ 1250}$ value received from the terminal by computing $MAC_{UICC}$=HMAC-SHA-256(Ks_local, NAF_ID||Terminal_ID||ICCID||Term_appli_ID||UICC_appli_ID||RANDx||RANDy||Counter Limit) truncated to 16 octets, and comparing it to $MAC_{IKC}$. If the $MAC_{UICC}$ does not equal $MAC_{IKC}$, the UICC 1260 terminates the key agreement procedure and returns a MAC verification failure message in response to the Ks_local derivation request. If $MAC_{UICC}$=$MAC_{IKC}$, then the UICC 1260 stores Ks_local and associated parameters (Terminal_ID, Terminal_appli_ID, UICC_appli_ID and the Ks_local Counter Limit). At S7 the UICC 1260 sends a Ks_local derivation response containing a MAC of the ASCII-encoded string "verification successful" using the key Ks_local and the MAC algorithm HMAC-SHA-256 truncated to 16 octets. The IKC 1250, at S8, stores the Ks_local and Key Lifetime. For each of the NAFs for which a local key Ks_local is requested, steps S4 to S8 are repeated.

In the methods described above, in an alternative embodiment the pre-shared keys $K_{UH}$ and the $K_{IH}$ are not used directly, but are used as pre-shared secrets, and the actual shared keys are derived from these pre-shared secrets. The derived shared keys can be updated, i.e., they become session keys. In this way, even if a session key derived from either $K_{UH}$ or $K_{IH}$ is revealed, the secret itself may still be protected.

Referring to the TLS-PSK tunnels discussed above, other methods of authenticated encryption using pre-shared secrets can be used as an alternative. One alternative embodiment combines the use of the Extensible Authentication Protocol (EAP) over Remote Authentication Dial-In User Service (RADIUS). Such an alternate method can be applied to all three (3) parts of the new proposed protocols described further below.

Additionally, in the procedures described above, TLS can be used without tunneling, i.e., TLS is used only for encryption and authentication, but not for authorization.

The requirement that permeates the methods described above, the pre-shared secret keys or session keys derived from pre-shared secret keys are used to protect the GBA_U, Security Association, and the Local Key generation processes are required only for the case where the local key Ks_local has to be generated for the first time. If, under the protection of the mechanisms proposed herein, a local key Ks_local is generated and made securely present on both the UICC 1260 and the Terminal (even after power-off of the phone or removal of the UICC), and if the Ks_local is maintained (for management purposes) at the NAF Key Center, there is no need for the procedures proposed to be repeated at later times when any of the three (3) processes, that is, GBA_U, Security Association, or Local Key derivation process, has to take place again. This is because, in such cases, the already-generated and securely-stored local key Ks_local can be used, instead of the pre-shared secrets (or keys) proposed in this disclosure, to protect the integrity and confidentiality of the information flow in the original, unmodified processes (GBA_U, Security Association, and Local Key Derivation) inst, as well as in the NAF Key Center.

The new methods proposed above are also applicable, with slight modification, to the existing protocols of securitizing the channel between a UICC 1260-hosting device and a Remote Device.

Use of the MTM to Secure the IKC 1250

A mobile trusted module (MTM) may be used on the mobile phone (UE) to protect the integrity of the Internal Key Center (IKC 1250) and the data it handles and processes in order to execute the proposed methods (see Part-1, Part-2, and Part-3 described above) of enhanced GBA_U, security association, and local key establishment for secure channels between the UICC 1260 and the Terminal.

Figure 18:
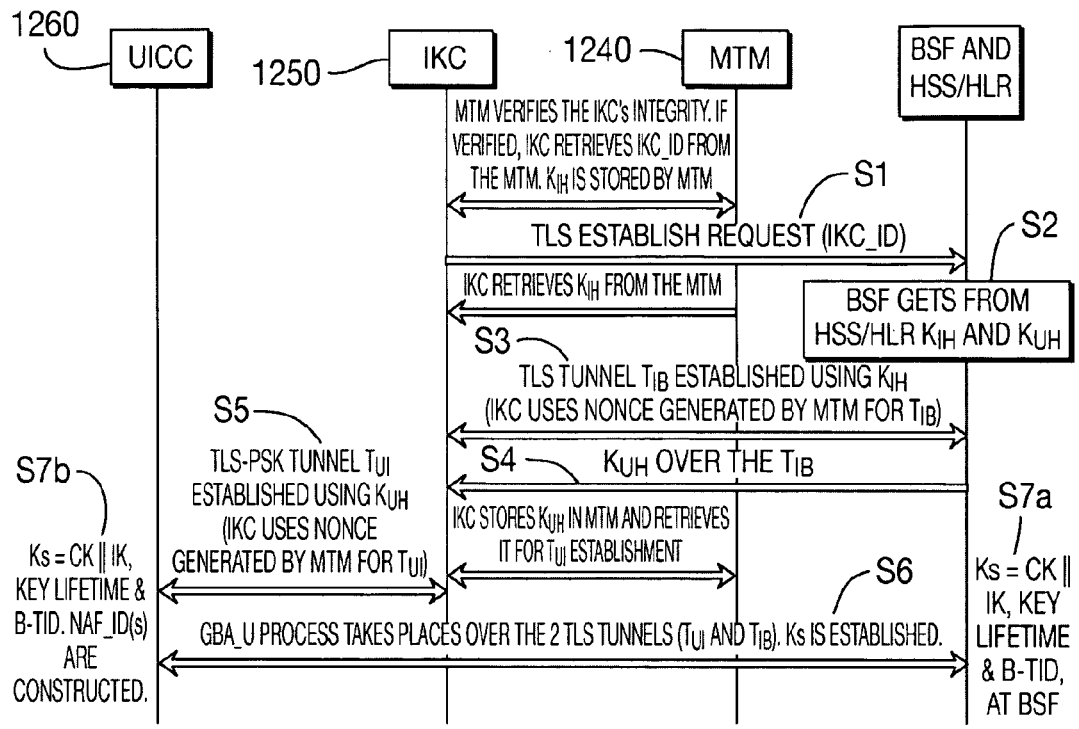
FIG. 18 shows a method for an MTM protecting the integrity of the IKC and the keys and data the IKC processes.

FIG. 18 depicts how the MTM 1240 can be used for the modified GBA_U process (Part-1) described in Section 4.3. The MTM 1240 is primarily used to verify the integrity of the IKC 1250 before the IKC 1250 proceeds with the GBA_U process. The MTM 1240 is also used to securely store, either within itself (under a secure, non-volatile NVRAM) or by protecting an encryption key that is used for encryption of the keys needed for the tunneling between the IKC 1250 and the BSF 1270 as well as between the IKC 1250 and the UICC 1260. The MTM 1240 is also used to generate random numbers to be used as nonces in the TLS-PSK tunnels.

Similarly as described above for the Part 1 (GBA_U) process, the Part-2 (Security Association) and Part 3 (local key generation) steps proposed above can also be strengthened by using the MTM 1240 in a similar manner. The MTM 1240 is used to: verify the integrity of the IKC 1250 before each of the processes; secure, store and allow the IKC 1250 to retrieve keys and other sensitive material that the IKC 1250 either generates or receives from other entities such as the UICC 1260 and the BSF 1270; and generate random numbers to be used for nonces for each of the processes.

Figure 19:
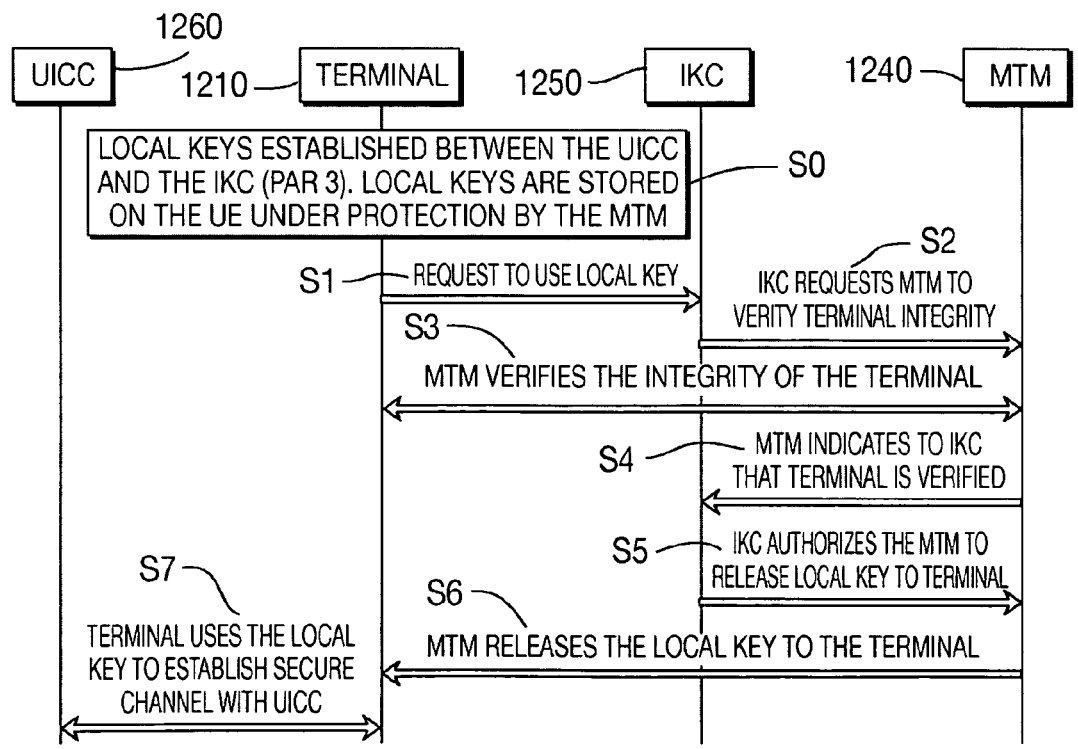
FIG. 19 shows a system wherein an MTM is coupled between the terminal and the IKC.

FIG. 19 shows the use of the MTM 1240 with the Terminal and the IKC 1250. The MTM 1240 may also be used to verify the integrity of the Terminal when the IKC 1250 is separate from the Terminal, which is considered to be less trustworthy or secure than the IKC 1250. This enables the Terminal to securely retrieve and later use the local keys Ks_local derived between the UICC 1260 and the IKC 1250 and by the UICC 1260 and the Terminal. Referring to FIG. 19, using the key Ks_local derived between the UICC 1260 and the IKC 1250 (see the end of Part-3), the IKC 1250 securely stores the Ks_local either within the MTM 1240 or under cryptographic protection by the MTM 1240. Any platform or application specific keys derived from the Ks_local are also securely stored in the same way by the MTM 1240. Before the Terminal (separate from the IKC 1250) can use the Ks_local or any of the keys derived from it, the Terminal, at S1, requests the IKC 1250 for use of the local key. The IKC 1250, at S2, asks the MTM 1240 to verify the integrity of the Terminal. The MTM 1240, at S3, verifies the integrity of the Terminal. Only after the Terminal's integrity is verified to the Terminal and the IKC 1250 by the MTM 1240, at S3 and S4, does the IKC 1250, at S5, authorize the MTM 1240 to release the keys requested by the Terminal to be used for communication between the Terminal and the UICC 1260. The local key(s)

are released to the Terminal by the MTM 1240 at S6. The Terminal uses the local keys to establish secure channel(s) with the UICC 1260, at S7.

Some of the benefits of the proposed solution are set forth below. The steps S2, S3, and S4 of FIG. 19 allow a 'bulk' transfer and processing of the keys and key material between the IKC 1250 and the BSF 1270, where material for more than one NAF can be exchanged and processed to derive Ks_local keys specific to the NAFs, thereby reducing the number of OTA procedures that are required if the derivation of the Ks_local for multiple NAFs is performed according to the prior art. Secondly, the information exchanged between the UICC 1260 and the IKC 1250, and between the IKC 1250 and the BSF 1270, is now protected for both integrity and confidentiality, due to the use of the two TLS-PSK tunnels. This mitigates the privacy and potential security risks in the prior art due to problems described above. This benefit is applicable not only to the process of the local key establishment but also to the GBA_U and security association processes as well. Thirdly, the use of separate shared secrets $K_{UI}$ and $K_{IH}$, neither of which are traceable to the existing subscriber secret K, isolates the process of the tunneling to the subscriber secrets shared by the UICC 1260 and the HLR/HSS 1280, which reduces the security risk as a potential breach of the $K_{UI}$ and $K_{IH}$ keys will not reveal the subscriber secret. Fourthly, the use of the IKC 1250 adds security benefits because IKC 1250 is a trusted entity whose trustworthiness is protected (verifiable and attestable) by the MTM 1240 on the WTRU 1200. Since the local keys (Ks_local) and key material are handled by the trusted IKC 1250, and also because the IKC 1250 can use the MTM 1240's secure storage capability to keep this information as well as the MTM 1240's protected capabilities such as the random number generator for the creation of the RANDx and RANDy, the overall processing security is enhanced. Finally, the use of the MTM 1240 to verify the integrity of the IKC 1250 (and of the terminal when the IKC 1250 and the terminal are separate entities), to securely store keys and key material, and to securely generate random numbers to be used as nonces, adds to the security and trustworthiness of the processes (Part-1 to Part-3) to establish the local keys and also allowing the Terminal to use the local keys generated by the IKC 1250 and the UICC 1260 only after the integrity of the local keys is verified by the MTM 1240.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), Terminal, ME, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for use by a wireless transmit/receive unit (WTRU) for establishing secure communication, the method comprising:
    establishing a secure tunnel, configured to enable a secure communication during a GBA_U process and a local-key set-up process, between an internal key center (IKC) and a UMTS Integrated Circuit Card (UICC), wherein the IKC is a trusted local entity residing on the WTRU, wherein the secure tunnel between the IKC and the UICC is a transport layer security-pre-shared key (TLS-PSK) tunnel established using a successfully authenticated pre-shared key set; and
    establishing a secure channel between the UICC and the IKC by performing the GBA_U process and the local-key set-up process over the established secure tunnel between the IKC and the UICC.

2. The method of claim 1 wherein establishing the secure tunnel between the IKC and the UICC includes:
    establishing another secure tunnel between the IKC and a bootstrapping server function (BSF); and
    receiving a first key over the secure tunnel between the IKC and the BSF, wherein the secure tunnel between the IKC and the UICC is established using the first key.

3. The method of claim 2 wherein the secure tunnel between the IKC and the BSF is a transport layer security-pre-shared key (TLS-PSK) tunnel.

4. The method of claim 1 wherein the secure tunnel between the IKC and the UICC is established using shared secrets.

5. The method of claim 4 wherein the shared secrets are pre-provisioned in the IKC and the UICC.

6. A wireless transmit/receive unit (WTRU) configured to establish secure communication, the WTRU comprising:
    an internal key center (IKC), residing on the WTRU as a trusted local entity, configured to:
        establish a secure tunnel, configured to enable a secure communication during a GBA_U process and a local-key set-up process, between the IKC and a UMTS Integrated Circuit Card (UICC), wherein the secure tunnel between the IKC and the UICC is a transport layer security-pre-shared key (TLS-PSK) tunnel established using a successfully authenticated pre-shared key set, and
        establish a secure channel between the UICC and a bootstrap server function (BSF) by performing the GBA_U process and the local-key set-up process over the established secure tunnel between the IKC and the UICC.

7. The WTRU of claim 6 wherein the IKC is further configured to:
  establish a secure tunnel between the IKC and the BSF; and
  receive a first key over the secure tunnel between the IKC and the BSF, wherein the secure tunnel between the IKC and the UICC is established using the first key.

8. The WTRU of claim 7 wherein the secure tunnel between the IKC and the BSF is a transport layer security-pre-shared key (TLS-PSK) tunnel.

9. The WTRU of claim 6 wherein the secure tunnel between the IKC and the UICC is established using shared secrets.

10. The WTRU of claim 9 wherein the shared secrets are pre-provisioned in the IKC and the UICC.

11. A method employed by an Internal Key Center (IKC) for a secure communication, the method comprising:
  establishing a first secured tunnel between the IKC and a UMTS Integrated Circuit Card (UICC), wherein the IKC is a trusted local entity residing on a wireless transmit/receive unit (WTRU), wherein the first secured tunnel is a transport layer security-pre-shared key (TLS-PSK) tunnel established using a successfully authenticated pre-shared key set;
  establishing a second secured tunnel between the IKC and a bootstrap server function (BSF); and
  providing security association information for at least two network applications functions to the UICC using said first and second tunnels.

12. The method of claim 11, further comprising: transferring a security association response from the UICC to the BSF using said first and second tunnels.

13. A method, for use by a wireless transmit/receive unit (WTRU) including an internal key center (IKC) for establishing secure local keys, the method comprising:
  determining whether a valid key exists on a UMTS Integrated Circuit Card (UICC), and if so:
    retrieving, via a secure tunnel between the IKC and the UICC, a bootstrapping transaction identifier (B-TID) and at least one network application function identifier (NAF-ID) from the UICC, wherein the IKC is a trusted local entity residing on the WTRU, and wherein the secure tunnel between the IKC and UICC is a transport layer security-pre-shared key (TLS-PSK) tunnel established using a successfully authenticated pre-shared key set;
    sending an application request for keys to a bootstrap server function (BSF);
    receiving an application response including at least one key;
    generating a counter limit and deriving local keys from related parameters for the at least one NAF;
    sending an application request for key establishment to the UICC;
    receiving a local deviation response indicating successful verification of the local keys; and
    storing the local keys and the related parameters in the IKC.

14. The method of claim 13 wherein retrieving the bootstrapping transaction identifier (B-TID) and the at least one network application function identifier (NAF-ID) from the UICC is done over the secure tunnel between the IKC and UICC.

15. The method of claim 13 wherein sending the application request for keys to the bootstrap server function (BSF) is done over a second secure tunnel.

16. The method of claim 15 wherein receiving the application response including the at least one key is done over the second secure tunnel.

17. The method of claim 16 wherein the second tunnel is a transport layer security-pre-shared key (TLS-PSK) tunnel established using a second successfully authenticated pre-shared key set.

* * * * *